United States Patent
Hember et al.

(10) Patent No.: US 12,005,404 B2
(45) Date of Patent: Jun. 11, 2024

(54) BEVERAGE CARBONATION SYSTEM FLOW CONTROL

(71) Applicant: SharkNinja Operating LLC, Needham, MA (US)

(72) Inventors: Miles William Noel Hember, Cambridge (GB); Noa Reisner-Stehman, Cambridge, MA (US); Scott John Shaw, Waltham, MA (US)

(73) Assignee: SharkNinja Operating LLC, Needham, MA (US)

( * ) Notice: Subject to any disclaimer, the term of this patent is extended or adjusted under 35 U.S.C. 154(b) by 14 days.

(21) Appl. No.: 17/821,212

(22) Filed: Aug. 22, 2022

(65) Prior Publication Data

US 2024/0058772 A1 Feb. 22, 2024

(51) Int. Cl.
  *B01F 23/23* (2022.01)
  *A23L 2/54* (2006.01)
  (Continued)

(52) U.S. Cl.
  CPC ............ *B01F 23/2364* (2022.01); *A23L 2/54* (2013.01); *B01F 23/233* (2022.01);
  (Continued)

(58) Field of Classification Search
  CPC ................ B01F 23/2364; B01F 23/233; B01F 23/237621; B01F 35/2211; B01F 2101/14;
  (Continued)

(56) References Cited

U.S. PATENT DOCUMENTS

| | | | |
|---|---|---|---|
| 1,242,493 | A | 10/1917 | Stringham |
| 1,420,773 | A | 6/1922 | Stainbrook |

(Continued)

FOREIGN PATENT DOCUMENTS

| | | |
|---|---|---|
| AU | 2014241782 B2 | 9/2017 |
| CA | 2903862 A1 | 9/2014 |

(Continued)

OTHER PUBLICATIONS

International Search Report and Written Opinion for PCT Patent Application No. PCT/US2023/068112 mailed on Oct. 11, 2023.

(Continued)

*Primary Examiner* — Stephen Hobson
(74) *Attorney, Agent, or Firm* — Mintz, Levin, Cohn, Ferris, Glovsky and Popeo, P.C.

(57) ABSTRACT

Various illustrative systems, devices, and methods of beverage carbonation system flow control are provided. A carbonation system is one example of a treatment system to which the systems, devices, and methods described herein apply. In general, a carbonation system is configured to form a carbonated fluid and dispense the carbonated fluid in a controlled manner. In an illustrative embodiment, the carbonation system is configured to begin dispensing the carbonated fluid with a pressure in a chamber of the carbonation system, in which the carbonated fluid is formed, being above atmospheric pressure. A gas is introduced into the chamber after dispensing has already started via the pressure in the chamber to drive the flow of the carbonated fluid. The gas can be introduced into the chamber according to a predetermined pressure profile.

13 Claims, 8 Drawing Sheets

(51) Int. Cl.
*B01F 23/233* (2022.01)
*B01F 23/236* (2022.01)
*B01F 23/237* (2022.01)
*B01F 35/221* (2022.01)
*B67D 1/00* (2006.01)
*B01F 101/14* (2022.01)

(52) U.S. Cl.
CPC .. *B01F 23/237621* (2022.01); *B01F 35/2211* (2022.01); *B67D 1/0071* (2013.01); *B01F 2101/14* (2022.01); *B67D 2001/0098* (2013.01)

(58) Field of Classification Search
CPC .............. B01F 23/2363; B01F 27/1111; B01F 35/2111; B01F 35/2113; B01F 35/2213; B01F 35/7543; B01F 23/2362; A23L 2/54; B67D 1/0071; B67D 2001/0098
See application file for complete search history.

(56) References Cited

U.S. PATENT DOCUMENTS

| | | | |
|---|---|---|---|
| 3,552,726 A * | 1/1971 | Kraft | B01F 23/2362 261/50.1 |
| 3,578,214 A * | 5/1971 | Iannelli | B01F 23/2362 222/394 |
| 3,752,452 A * | 8/1973 | Iannelli | B01F 35/71805 261/DIG. 7 |
| 3,813,010 A | 5/1974 | Hassell et al. | |
| 3,881,636 A * | 5/1975 | D'Aubreby | G01F 11/22 141/51 |
| 4,251,473 A | 2/1981 | Gilbey | |
| 4,304,736 A * | 12/1981 | McMillin | B67D 1/103 417/396 |
| 4,518,541 A | 5/1985 | Harris | |
| 4,752,138 A | 6/1988 | Rufer | |
| 4,866,324 A | 9/1989 | Yuzawa et al. | |
| 5,038,976 A | 8/1991 | Mcmillin | |
| 5,124,088 A * | 6/1992 | Stumphauzer | B67D 1/0057 261/DIG. 7 |
| 5,128,574 A | 7/1992 | Koizumi et al. | |
| 5,156,871 A | 10/1992 | Goulet et al. | |
| 6,095,677 A | 8/2000 | Karkos et al. | |
| 6,237,652 B1 * | 5/2001 | Nelson | B67C 3/2608 141/2 |
| 6,336,603 B1 | 1/2002 | Karkos et al. | |
| 6,672,481 B2 | 1/2004 | Ziesel | |
| 6,712,497 B2 | 3/2004 | Jersey et al. | |
| 7,097,074 B2 | 8/2006 | Halliday et al. | |
| 7,114,707 B2 | 10/2006 | Rona et al. | |
| 7,213,506 B2 | 5/2007 | Halliday et al. | |
| 7,219,598 B2 | 5/2007 | Halliday et al. | |
| 7,231,869 B2 | 6/2007 | Halliday et al. | |
| 7,255,039 B2 | 8/2007 | Halliday et al. | |
| 7,287,461 B2 | 10/2007 | Halliday et al. | |
| 7,288,276 B2 | 10/2007 | Rona et al. | |
| 7,316,178 B2 | 1/2008 | Halliday et al. | |
| 7,322,277 B2 | 1/2008 | Halliday et al. | |
| 7,418,899 B2 | 9/2008 | Halliday et al. | |
| 7,445,133 B2 | 11/2008 | Ludovissie et al. | |
| 7,533,603 B2 | 5/2009 | Halliday et al. | |
| 7,533,604 B2 | 5/2009 | Halliday et al. | |
| 7,592,027 B2 | 9/2009 | Halliday et al. | |
| 7,607,385 B2 | 10/2009 | Halliday et al. | |
| 7,669,737 B2 | 3/2010 | Bethuy et al. | |
| 7,681,492 B2 | 3/2010 | Suggi et al. | |
| 7,703,381 B2 | 4/2010 | Liverani et al. | |
| 7,731,161 B2 | 6/2010 | Seiwert et al. | |
| 7,806,294 B2 | 10/2010 | Gatipon et al. | |
| 7,975,988 B2 | 7/2011 | Thomson et al. | |
| 8,087,347 B2 | 1/2012 | Halliday et al. | |
| 8,113,384 B2 | 2/2012 | Bethuy et al. | |
| 8,172,453 B2 | 5/2012 | Boussemart et al. | |
| 8,282,268 B2 | 10/2012 | Karkos et al. | |
| 8,403,179 B1 | 3/2013 | Gerber | |
| 8,555,774 B2 | 10/2013 | Patera et al. | |
| 8,590,746 B2 | 11/2013 | Bethuy et al. | |
| 8,616,412 B2 | 12/2013 | Bethuy et al. | |
| 8,621,990 B2 | 1/2014 | Fang et al. | |
| 8,661,966 B2 | 3/2014 | Stearns et al. | |
| 8,668,376 B2 | 3/2014 | Krauchi et al. | |
| 8,677,888 B2 | 3/2014 | Santoiemmo | |
| 8,685,477 B2 | 4/2014 | Almblad et al. | |
| 8,746,506 B2 | 6/2014 | Jersey et al. | |
| 8,757,227 B2 | 6/2014 | Girard et al. | |
| 8,770,094 B2 | 7/2014 | Rithener et al. | |
| 8,794,126 B2 | 8/2014 | Skalski et al. | |
| 8,807,824 B2 | 8/2014 | Bodum | |
| 8,826,688 B2 | 9/2014 | Tachibana et al. | |
| 8,833,241 B2 | 9/2014 | Santoiemmo | |
| 8,840,092 B2 | 9/2014 | Kumar et al. | |
| 8,844,555 B2 | 9/2014 | Schneider | |
| 8,960,500 B2 | 2/2015 | Van Opstal et al. | |
| 8,985,395 B2 | 3/2015 | Tansey | |
| 8,985,396 B2 | 3/2015 | Jersey et al. | |
| 8,985,561 B2 | 3/2015 | Hatherell | |
| 9,026,245 B2 | 5/2015 | Tilton et al. | |
| 9,044,718 B2 | 6/2015 | Ludwig et al. | |
| 9,045,722 B2 | 6/2015 | Reif et al. | |
| 9,051,162 B2 | 6/2015 | Peters et al. | |
| 9,056,287 B2 | 6/2015 | Peltola et al. | |
| 9,060,650 B2 | 6/2015 | De | |
| 9,107,448 B2 | 8/2015 | Giardino et al. | |
| 9,107,449 B2 | 8/2015 | Njaastad et al. | |
| 9,107,533 B2 | 8/2015 | Volz et al. | |
| 9,114,368 B2 | 8/2015 | Njaastad et al. | |
| 9,155,330 B1 | 10/2015 | Shtivelman | |
| 9,161,654 B2 | 10/2015 | Belmont | |
| 9,166,448 B2 | 10/2015 | Lam et al. | |
| 9,167,935 B2 | 10/2015 | Scholvinck et al. | |
| 9,233,824 B2 | 1/2016 | Alan et al. | |
| 9,290,317 B2 | 3/2016 | Quinn et al. | |
| 9,295,278 B2 | 3/2016 | Nowak | |
| 9,333,443 B2 * | 5/2016 | Zahka | B01D 19/0031 |
| 9,364,018 B1 | 6/2016 | Peterson et al. | |
| 9,371,176 B2 | 6/2016 | Kohli et al. | |
| 9,375,686 B2 | 6/2016 | Boarman et al. | |
| 9,409,759 B2 | 8/2016 | Wilder et al. | |
| 9,440,836 B2 | 9/2016 | Quittner et al. | |
| 9,481,508 B2 | 11/2016 | Oh | |
| 9,486,102 B2 | 11/2016 | Baldo | |
| 9,493,298 B2 | 11/2016 | Evans et al. | |
| 9,505,510 B2 | 11/2016 | Hatherell | |
| 9,521,924 B2 | 12/2016 | Priley et al. | |
| 9,527,047 B2 | 12/2016 | Ring et al. | |
| D779,046 S | 2/2017 | Tansey, Jr. | |
| 9,630,157 B2 | 4/2017 | Li et al. | |
| 9,651,188 B2 | 5/2017 | Green et al. | |
| 9,664,264 B2 | 5/2017 | Kristlbauer | |
| 9,687,796 B2 | 6/2017 | Hoare et al. | |
| 9,701,527 B2 | 7/2017 | Tansey, Jr. | |
| 9,708,109 B2 | 7/2017 | Marina et al. | |
| 9,718,035 B2 | 8/2017 | Bandixen et al. | |
| 9,723,863 B2 | 8/2017 | Njaastad et al. | |
| 9,751,054 B2 | 9/2017 | Jin et al. | |
| 9,754,437 B2 | 9/2017 | Deo et al. | |
| 9,783,403 B2 | 10/2017 | Tansey, Jr. | |
| 9,783,405 B2 | 10/2017 | Olson et al. | |
| 9,790,076 B2 | 10/2017 | Novak et al. | |
| 9,801,500 B2 | 10/2017 | Ven Der Woning | |
| 9,809,437 B2 | 11/2017 | Tansey, Jr. | |
| 9,821,951 B2 | 11/2017 | Estabrook et al. | |
| 9,854,935 B2 | 1/2018 | Danieli et al. | |
| 9,897,220 B2 | 2/2018 | Cohen et al. | |
| 10,000,370 B2 | 6/2018 | Bethuy et al. | |
| 10,017,372 B2 | 7/2018 | Bethuy et al. | |
| 10,028,614 B2 | 7/2018 | Perentes et al. | |
| 10,046,903 B2 | 8/2018 | Evans et al. | |
| 10,046,904 B2 | 8/2018 | Evans et al. | |
| 10,051,988 B2 | 8/2018 | Gordon et al. | |
| 10,058,826 B2 | 8/2018 | Cohen et al. | |
| 10,070,751 B2 | 9/2018 | Magniet et al. | |
| 10,099,443 B1 | 10/2018 | Evans et al. | |

(56) References Cited

U.S. PATENT DOCUMENTS

| | | |
|---|---|---|
| 10,131,529 B2 | 11/2018 | Jersey et al. |
| 10,143,978 B2 | 12/2018 | Tipton |
| 10,155,647 B2 | 12/2018 | Foster et al. |
| 10,159,376 B2 | 12/2018 | Dovat et al. |
| 10,165,892 B2 | 1/2019 | Lafosse |
| 10,193,411 B2 | 1/2019 | Tajima et al. |
| 10,201,171 B2 | 2/2019 | Gordon et al. |
| 10,201,785 B2 | 2/2019 | Cohen et al. |
| 10,206,533 B2 | 2/2019 | Pirone |
| 10,213,752 B2 | 2/2019 | Shalev |
| 10,227,226 B2 | 3/2019 | Jersey et al. |
| 10,307,718 B2 | 6/2019 | Waisman |
| 10,329,134 B2 | 6/2019 | Olson et al. |
| 10,334,871 B2 | 7/2019 | Van De Sluis et al. |
| 10,336,597 B2 | 7/2019 | Griscik et al. |
| 10,343,885 B2 | 7/2019 | Novak et al. |
| 10,349,773 B2 | 7/2019 | Segiet et al. |
| 10,350,561 B1 | 7/2019 | Dushine et al. |
| 10,370,235 B2 | 8/2019 | Pellaud |
| 10,377,620 B2 | 8/2019 | Makino et al. |
| 10,399,838 B2 | 9/2019 | Green |
| 10,399,839 B2 | 9/2019 | Knoll et al. |
| 10,405,690 B2 | 9/2019 | Tentorio |
| 10,433,668 B2 | 10/2019 | Merali et al. |
| 10,455,973 B2 | 10/2019 | Dollner et al. |
| 10,456,757 B1 | 10/2019 | Blichmann |
| 10,470,605 B2 | 11/2019 | Ergican et al. |
| 10,485,374 B2 | 11/2019 | Lo Faro et al. |
| 10,506,896 B2 | 12/2019 | Ven Der Woning |
| 10,513,424 B2 | 12/2019 | Tansey, Jr. |
| 10,518,938 B2 | 12/2019 | Suzuki et al. |
| 10,519,020 B2 | 12/2019 | Ozawa et al. |
| 10,524,617 B2 | 1/2020 | Perrin et al. |
| 10,526,186 B2 | 1/2020 | Kuboi et al. |
| 10,543,977 B2 | 1/2020 | Brockman et al. |
| 10,568,452 B2 | 2/2020 | Fin et al. |
| 10,595,549 B2 | 3/2020 | Van De Sluis et al. |
| 10,631,686 B2 | 4/2020 | Abdo et al. |
| 10,647,564 B2 | 5/2020 | Showalter |
| 10,654,700 B2 | 5/2020 | Hecht |
| 10,674,857 B2 | 6/2020 | Lyons et al. |
| 10,674,863 B2 | 6/2020 | Sevcik et al. |
| 10,676,336 B2 | 6/2020 | Makino et al. |
| 10,682,007 B2 | 6/2020 | Fischer |
| 10,702,835 B2 | 7/2020 | Tran et al. |
| 10,702,838 B2 | 7/2020 | Chaussin et al. |
| 10,707,734 B2 | 7/2020 | Holenstein et al. |
| 10,765,254 B2 | 9/2020 | Iotti et al. |
| 10,780,408 B2 | 9/2020 | Schöb et al. |
| 10,791,752 B2 | 10/2020 | Siegel et al. |
| 10,793,346 B2 | 10/2020 | Bartoli et al. |
| 10,807,049 B2 | 10/2020 | Abdo et al. |
| 10,807,853 B2 | 10/2020 | Balstad et al. |
| 10,813,501 B2 | 10/2020 | Helf et al. |
| 10,829,359 B2 | 11/2020 | Von Kraus et al. |
| 10,842,313 B2 | 11/2020 | Novak et al. |
| 10,843,142 B2 | 11/2020 | Waggoner et al. |
| 10,843,866 B2 | 11/2020 | Cafaro et al. |
| 10,846,975 B2 | 11/2020 | Tansey et al. |
| 10,849,451 B2 | 12/2020 | Su |
| 10,849,454 B2 | 12/2020 | Gordon et al. |
| 10,865,091 B2 * | 12/2020 | Bhutani ............... B67D 1/0057 |
| 10,869,572 B2 | 12/2020 | Blatt |
| 10,870,566 B2 | 12/2020 | Green et al. |
| 10,882,728 B2 | 1/2021 | Hong et al. |
| 10,883,072 B2 | 1/2021 | Hong et al. |
| 10,893,773 B2 | 1/2021 | Standaar et al. |
| 10,905,287 B2 | 2/2021 | Tu et al. |
| 10,906,013 B2 | 2/2021 | Cohen et al. |
| 10,919,752 B2 | 2/2021 | Breault |
| 10,945,554 B2 | 3/2021 | Lo Faro et al. |
| 10,945,557 B2 | 3/2021 | Nishimura et al. |
| 10,947,485 B2 | 3/2021 | Min et al. |
| 10,952,562 B2 | 3/2021 | Tanner et al. |
| 10,966,564 B2 | 4/2021 | Rijskamp et al. |
| 11,021,359 B2 | 6/2021 | Bissen et al. |
| 11,064,715 B2 | 7/2021 | Herbert et al. |
| 11,084,007 B2 | 8/2021 | Adams |
| 11,084,701 B2 | 8/2021 | Kuboi et al. |
| 11,097,236 B2 | 8/2021 | Alexander et al. |
| 11,110,418 B2 | 9/2021 | Furman et al. |
| 11,124,404 B2 | 9/2021 | Von Kraus et al. |
| 11,129,490 B2 | 9/2021 | Park et al. |
| 11,129,491 B2 | 9/2021 | Park et al. |
| 11,148,927 B2 | 10/2021 | Wing et al. |
| 11,166,593 B2 | 11/2021 | Trakselis |
| 11,167,231 B2 | 11/2021 | Akdim et al. |
| 11,194,443 B2 | 12/2021 | Deo et al. |
| 11,206,941 B2 | 12/2021 | Abdo et al. |
| 11,208,310 B2 | 12/2021 | Tansey et al. |
| 11,246,326 B2 | 2/2022 | Feola |
| 11,247,186 B2 | 2/2022 | Topp-manske |
| 11,250,659 B2 | 2/2022 | Tansey et al. |
| 11,252,976 B2 | 2/2022 | Popov et al. |
| 11,254,491 B2 | 2/2022 | Krüger |
| 11,254,586 B1 | 2/2022 | Santoiemmo |
| 11,274,027 B2 | 3/2022 | Krüger et al. |
| 11,284,736 B2 | 3/2022 | Ochoa et al. |
| 11,312,604 B2 | 4/2022 | Mehta et al. |
| 11,819,218 B2 * | 11/2023 | Balfour ............ A61B 17/12181 |
| 2003/0012849 A1 | 1/2003 | Berson |
| 2004/0124548 A1 * | 7/2004 | Rona .................... B67D 1/0057 |
| | | 261/DIG. 7 |
| 2013/0062366 A1 * | 3/2013 | Tansey ................. B67D 1/0809 |
| | | 222/101 |
| 2014/0097549 A1 * | 4/2014 | Hoare .................. B01F 35/2112 |
| | | 261/64.3 |
| 2014/0154368 A1 | 6/2014 | Kolls et al. |
| 2014/0175125 A1 | 6/2014 | Breault |
| 2015/0024088 A1 * | 1/2015 | Cohen ................. B01F 23/2362 |
| | | 261/28 |
| 2015/0028502 A1 * | 1/2015 | Fanelli ................. B67D 3/0041 |
| | | 261/140.1 |
| 2015/0034674 A1 * | 2/2015 | Hertensen ............ B67D 1/0801 |
| | | 222/145.5 |
| 2015/0125586 A1 | 5/2015 | Ergican |
| 2015/0374025 A1 | 12/2015 | Evans et al. |
| 2016/0009539 A1 | 1/2016 | Jersey et al. |
| 2016/0192806 A1 | 7/2016 | Pikkemaat et al. |
| 2016/0242456 A1 | 8/2016 | Evans et al. |
| 2016/0251208 A1 | 9/2016 | Tansey, Jr. |
| 2016/0255991 A1 | 9/2016 | Givens et al. |
| 2016/0318689 A1 | 11/2016 | Rudick et al. |
| 2016/0332124 A1 | 11/2016 | Cohen |
| 2017/0215645 A1 | 8/2017 | Doglioni Majer et al. |
| 2017/0334636 A1 | 11/2017 | Park et al. |
| 2017/0369298 A1 * | 12/2017 | Walton ................. B67D 1/0061 |
| 2018/0057337 A1 | 3/2018 | Babucke et al. |
| 2018/0251358 A1 | 9/2018 | Wing et al. |
| 2018/0251361 A1 | 9/2018 | Wing et al. |
| 2019/0077586 A1 | 3/2019 | Cafaro et al. |
| 2019/0134583 A1 | 5/2019 | Lautenschläger et al. |
| 2019/0146641 A1 | 5/2019 | Deo et al. |
| 2019/0153368 A1 | 5/2019 | Yoon et al. |
| 2019/0169016 A1 | 6/2019 | Vandekerckhove et al. |
| 2019/0191916 A1 | 6/2019 | Guyon et al. |
| 2019/0269156 A1 | 9/2019 | Van De Sluis et al. |
| 2019/0270630 A1 * | 9/2019 | Dahan .................... E03C 1/057 |
| 2019/0274469 A1 | 9/2019 | Van De Sluis |
| 2019/0274482 A1 | 9/2019 | Abdo et al. |
| 2019/0275478 A1 | 9/2019 | Jersey et al. |
| 2019/0291062 A1 | 9/2019 | Wood et al. |
| 2019/0291064 A1 | 9/2019 | Conroy et al. |
| 2019/0292034 A1 | 9/2019 | Wood et al. |
| 2019/0292036 A1 | 9/2019 | Rice et al. |
| 2019/0328170 A1 | 10/2019 | Cai |
| 2019/0335952 A1 | 11/2019 | Di Bari |
| 2019/0337713 A1 | 11/2019 | Ergican et al. |
| 2019/0367350 A1 | 12/2019 | Bhutani et al. |
| 2020/0010311 A1 | 1/2020 | Moore |
| 2020/0017806 A1 | 1/2020 | Peirsman et al. |
| 2020/0031651 A1 | 1/2020 | Schneidewend et al. |
| 2020/0047137 A1 | 2/2020 | Wilder et al. |
| 2020/0060465 A1 | 2/2020 | Longman et al. |

(56) References Cited

U.S. PATENT DOCUMENTS

| | | | |
|---|---|---|---|
| 2020/0077841 A1 | 3/2020 | Dercar et al. | |
| 2020/0079637 A1 | 3/2020 | Kaplita et al. | |
| 2020/0107671 A1 | 4/2020 | Gordon et al. | |
| 2020/0121115 A1 | 4/2020 | Oh | |
| 2020/0122100 A1 | 4/2020 | Tumey | |
| 2020/0122994 A1 | 4/2020 | Cimatti et al. | |
| 2020/0146308 A1 | 5/2020 | Roberts et al. | |
| 2020/0146500 A1 | 5/2020 | Cafaro et al. | |
| 2020/0146501 A1 | 5/2020 | Mchugh et al. | |
| 2020/0156019 A1 | 5/2020 | Sawyer et al. | |
| 2020/0187718 A1 | 6/2020 | Seidl | |
| 2020/0216786 A1 | 7/2020 | Pintz | |
| 2020/0229472 A1 | 7/2020 | Manne | |
| 2020/0253361 A1 | 8/2020 | Davidson | |
| 2020/0253414 A1* | 8/2020 | Godfrey | A47J 31/41 |
| 2020/0331739 A1 | 10/2020 | Mehta et al. | |
| 2020/0345170 A1 | 11/2020 | Jarisch et al. | |
| 2020/0359822 A1 | 11/2020 | Dercar et al. | |
| 2020/0359841 A1 | 11/2020 | Dercar et al. | |
| 2020/0360875 A1 | 11/2020 | Danieli et al. | |
| 2020/0361758 A1* | 11/2020 | Fantappié | B67D 1/0895 |
| 2020/0369504 A1 | 11/2020 | Balstad et al. | |
| 2020/0369505 A1 | 11/2020 | Mckay | |
| 2020/0375221 A1 | 12/2020 | Colvin et al. | |
| 2020/0397184 A1 | 12/2020 | Ruggiero et al. | |
| 2021/0000289 A1 | 1/2021 | Krüger et al. | |
| 2021/0013785 A1 | 1/2021 | Liang et al. | |
| 2021/0015303 A1 | 1/2021 | Byun et al. | |
| 2021/0106163 A1 | 4/2021 | Van De Sluis et al. | |
| 2021/0127902 A1 | 5/2021 | Deng et al. | |
| 2021/0137304 A1 | 5/2021 | Krger et al. | |
| 2021/0137315 A1 | 5/2021 | Byun et al. | |
| 2021/0171333 A1 | 6/2021 | Amos | |
| 2021/0177189 A1 | 6/2021 | Kordich et al. | |
| 2021/0179411 A1 | 6/2021 | Dahan et al. | |
| 2021/0196074 A1 | 7/2021 | Guarin et al. | |
| 2021/0259472 A1 | 8/2021 | Seidler et al. | |
| 2021/0261324 A1 | 8/2021 | Arnold | |
| 2021/0292152 A1 | 9/2021 | Fedorka et al. | |
| 2021/0307564 A1 | 10/2021 | Gort-Barten | |
| 2021/0317393 A1 | 10/2021 | Peirsman et al. | |
| 2021/0338004 A1 | 11/2021 | Alsayar et al. | |
| 2021/0361112 A1 | 11/2021 | Hobden et al. | |
| 2021/0362993 A1 | 11/2021 | Shafir et al. | |
| 2021/0378267 A1 | 12/2021 | Barak | |
| 2022/0002134 A1 | 1/2022 | Pellaud | |
| 2022/0022496 A1 | 1/2022 | Monsanto et al. | |
| 2022/0024748 A1 | 1/2022 | Fantappie et al. | |
| 2022/0031113 A1 | 2/2022 | Smith et al. | |
| 2022/0033172 A1 | 2/2022 | Favre | |
| 2022/0039587 A1 | 2/2022 | De Freitas | |
| 2022/0039602 A1 | 2/2022 | Xiong | |
| 2022/0040651 A1 | 2/2022 | Böttcher et al. | |
| 2022/0071441 A1 | 3/2022 | Patil et al. | |

FOREIGN PATENT DOCUMENTS

| | | |
|---|---|---|
| CA | 2961901 A1 | 4/2016 |
| CN | 1016312 B | 4/1992 |
| CN | 201200323 Y | 3/2009 |
| CN | 203314745 U | 12/2013 |
| CN | 203576299 U | 5/2014 |
| CN | 103720363 B | 11/2015 |
| CN | 105595868 A | 5/2016 |
| CN | 103430117 B | 5/2017 |
| CN | 109171502 A | 1/2019 |
| CN | 109380973 A | 2/2019 |
| CN | 110247484 A | 9/2019 |
| CN | 105011305 B | 5/2020 |
| CN | 111466793 A | 7/2020 |
| CN | 111589315 A | 8/2020 |
| CN | 112421819 A | 2/2021 |
| CN | 112998522 A | 6/2021 |
| CN | 108768070 B | 9/2021 |
| CN | 109863112 B | 2/2022 |
| EP | 1351758 A1 | 10/2003 |
| EP | 1767262 B1 | 8/2008 |
| EP | 1718403 B1 | 5/2011 |
| EP | 2340754 B1 | 10/2012 |
| EP | 2737834 A1 | 6/2014 |
| EP | 2969899 A2 | 1/2016 |
| EP | 3003542 A4 | 1/2017 |
| EP | 2359260 B1 | 6/2017 |
| EP | 3261981 A1 | 1/2018 |
| EP | 3040114 B1 | 3/2019 |
| EP | 3533937 A3 | 11/2019 |
| EP | 2504271 B1 | 4/2020 |
| EP | 3760795 A1 | 1/2021 |
| EP | 3200610 B1 | 2/2021 |
| ES | 2351796 T3 | 2/2011 |
| GB | 2486872 B | 3/2016 |
| RU | 2491875 C2 | 9/2013 |
| WO | 9807122 A1 | 2/1998 |
| WO | 0103817 A1 | 1/2001 |
| WO | 03098776 A1 | 11/2003 |
| WO | 2009135758 A1 | 11/2009 |
| WO | 2013019963 A3 | 5/2013 |
| WO | 2014201753 A1 | 12/2014 |
| WO | 2016202815 A1 | 12/2016 |
| WO | 2017109718 A1 | 6/2017 |
| WO | 2020148294 A1 | 7/2020 |
| WO | 2020148293 A3 | 9/2020 |
| WO | 2020174336 A1 | 9/2020 |
| WO | 2020193376 A1 | 10/2020 |
| WO | 2020219385 A1 | 10/2020 |
| WO | 2020234060 A1 | 11/2020 |
| WO | 2021016331 A1 | 1/2021 |
| WO | 2021016343 A1 | 1/2021 |
| WO | 2021018760 A1 | 2/2021 |
| WO | 2021032892 A1 | 2/2021 |
| WO | 2021055937 A1 | 3/2021 |
| WO | 2021101990 A1 | 5/2021 |
| WO | 2021138385 A1 | 7/2021 |
| WO | 2021168069 A1 | 8/2021 |
| WO | 2021174309 A1 | 9/2021 |
| WO | 2021191774 A1 | 9/2021 |
| WO | 2021228877 A1 | 11/2021 |
| WO | 2021233931 A1 | 11/2021 |
| WO | 2022038408 A1 | 2/2022 |

OTHER PUBLICATIONS

International Patent Application No. PCT/CN2022/092688 entitled "Agitator for A Carbonation System", filed May 13, 2022.
U.S. Appl. No. 17/744,459 entitled "Flavored Beverage Carbonation System", filed May 13, 2022, 40 pages.
Chemineer, Inc. (2013) "BT-6 Gas Dispersion Impeller", 2 pages.
Electrical Technology (May 2016) "Brushless DC Motor (BLDC)—Construction, Working & Applications", available at https://www.electricaltechnology.org/2016/05/bldc-brushless-dc-motor-construction-working-principle.html, 11 pages.
Scargiali, Francesca (2007) "Gas-liquid Dispersions in Mechanically Agitated Contactors", PhD Thesis, University of Naples, Department of Chemical, Materials And Industrial Production Engineering, 185 pages.
SPX Flow Inc. (Mar. 2019) "Lightnin Mixers General Overview", SPX®FLOW, 12 pages.

* cited by examiner

BEVERAGE CARBONATION SYSTEM FLOW CONTROL

FIELD

The present disclosure generally relates to beverage carbonation system flow control.

BACKGROUND

Various beverage carbonation systems are available that dispense carbonated beverages, for example, carbonated water. In some instances, the carbonated water can be flavored. Such beverage carbonation systems can be used in various locations by consumers, such as in homes or offices, to carbonate liquid and dispense the carbonated fluid into a container on demand.

Beverage carbonation systems can provide the carbonated fluid by mixing in a mixing chamber carbon dioxide ($CO_2$) gas with water to dissolve the $CO_2$ in the water. The dissolution takes place at a significantly elevated pressure to reach the required concentration of dissolved $CO_2$. The carbonated fluid thereafter exits the mixing chamber for dispensing to a user. However, a pressure within the mixing chamber cannot be too high when the carbonated fluid begins to be dispensed through a low-resistance channel or the pressure in the mixing chamber will cause the carbonated fluid to exit the mixing chamber at too high a rate such that the carbonated fluid will spray out of the carbonation system and cause messy splatter and/or cause at least some of the carbonated fluid to not be neatly dispensed into the container. Some systems have attempted to prevent high pressure in the mixing chamber from causing a violent dispense flow by inserting a substantial resistance to flow in the dispending outlet. However, such a flow restriction causes substantial decarbonation of the fluid as it passes through, which limits the efficiency of $CO_2$ use and also the achievable concentration of dissolved $CO_2$ in the dispensed fluid.

Accordingly, there remains a need for improved devices, systems, and methods for carbonation systems.

SUMMARY

In general, systems, devices, and methods of beverage carbonation system flow control are provided.

In one aspect, a method is provided that can include forming a treated fluid in a chamber of a treatment system. The chamber has an initial pressure after forming the treated fluid. The method also includes venting pressure from the chamber for a period of time, and starting to dispense treated fluid from the treatment system at a first point in time during the period of time. The chamber has a first pressure at the first point in time that is less than the initial pressure, and the first pressure assists in causing the treated fluid to be dispensed from the treatment system. The method also includes inputting a first gas into the chamber at a second point in time during the dispensing of the treated fluid. The chamber has a second pressure at the second point in time that is less than the first pressure. The inputting of the first gas assists in causing the treated fluid to dispense from the treatment system.

The method can vary in any number of ways. For example, the treated fluid can be dispensed from the first point in time to an end of dispensing at a substantially steady flow rate. The method can also include controlling a flow of the first gas input into the chamber to maintain the substantially steady flow rate. Controlling the flow can include modifying the flow during the dispensing.

For another example, forming the treated fluid can include adding a liquid to the chamber, adding carbon dioxide to the chamber, and agitating the liquid and the carbon dioxide in the chamber. The agitating can be performed concurrently to adding the carbon dioxide. The agitating can continue after stopping the adding of the carbon dioxide. The method can further includes, after an initial period commencing at a start of the carbon dioxide being added, substantially maintaining the pressure in the chamber at a predetermined level until stopping the adding of the carbon dioxide. The carbon dioxide can be added to a chamber from a gas source, and an injection rate of the carbon dioxide into the chamber can be controlled by a regulator operatively coupled between the gas source and the chamber.

For yet another example, forming the treated fluid can include mixing a liquid introduced into the chamber with a second gas introduced into the chamber, and the second gas can be a different type of gas from the first gas. The liquid can be water, and the second gas can be carbon dioxide.

For another example, forming the treated fluid can include mixing a liquid introduced into the chamber with a second gas introduced into the chamber, and the second gas can be a same type of gas as the first gas. The liquid can be water, and the second gas can be carbon dioxide.

For still another example, forming the treated fluid can include mixing a liquid introduced into the chamber with carbon dioxide introduced into the chamber, and the first gas can be air.

For another example, forming the treated fluid can include mixing a liquid introduced into the chamber with carbon dioxide introduced into the chamber, and the first gas can be carbon dioxide introduced into the chamber from a gas source.

For yet another example, beginning to dispense the treated fluid can include opening a valve of the treatment system.

For still another example, venting the pressure can include opening a valve in a headspace above the treated fluid in the chamber.

For another example, gravity can assist in the dispensing of the treated fluid.

In another aspect, a system is provided that can include a liquid source containing a liquid therein, a gas source containing a gas therein, and a chamber configured to receive therein the liquid from the liquid source and the gas from the gas source. A treated fluid is configured to be produced in the chamber by mixing the liquid and the gas therein. The system also includes an outlet having an open position dispense the treated fluid therethrough, and a vent operatively coupled to the chamber and configured to, prior to a start of the dispensing of the treated fluid, move from a closed position to an open position such that pressure vents from within the chamber. The vent is configured to remain in the open position when the dispensing of the treated fluid starts. The system also includes a processor configured to control opening of the outlet such that the treated fluid begins to flow out of the outlet during the venting of the pressure. The processor is also configured to control a force introduced into the chamber after the outlet has been opened such that the treated fluid continues to flow out of the outlet after the venting of the pressure from within the chamber has stopped.

The system can have any number of variations. For example, the processor controlling the force can include the processor controlling a gas regulator operatively coupled to the gas source.

For another example, the processor controlling the force can include the processor controlling an air pump configured to introduce air into the chamber after the dispensing has started.

For yet another example, the processor controlling the force can allow the treated fluid to be dispensed at a substantially steady flow rate.

For another example, the processor can be configured to cause the outlet to open in response to determining that a first threshold has been met, the force can be configured to start being introduced into the chamber in response to the processor determining that a second threshold has been met, and the processor can be configured to cause the outlet to close in response to determining that a third threshold has been met.

For still another example, the system can further include an agitator configured to agitate the liquid and the gas in the chamber to form a treated fluid, and a motor configured to drive rotation of the agitator within the chamber.

For another example, the liquid can be water, the gas can be carbon dioxide, and the treated fluid can be a carbonated fluid.

BRIEF DESCRIPTION OF DRAWINGS

This disclosure will be more fully understood from the following detailed description taken in conjunction with the accompanying drawings, in which.

DETAILED DESCRIPTION

Figure 1:
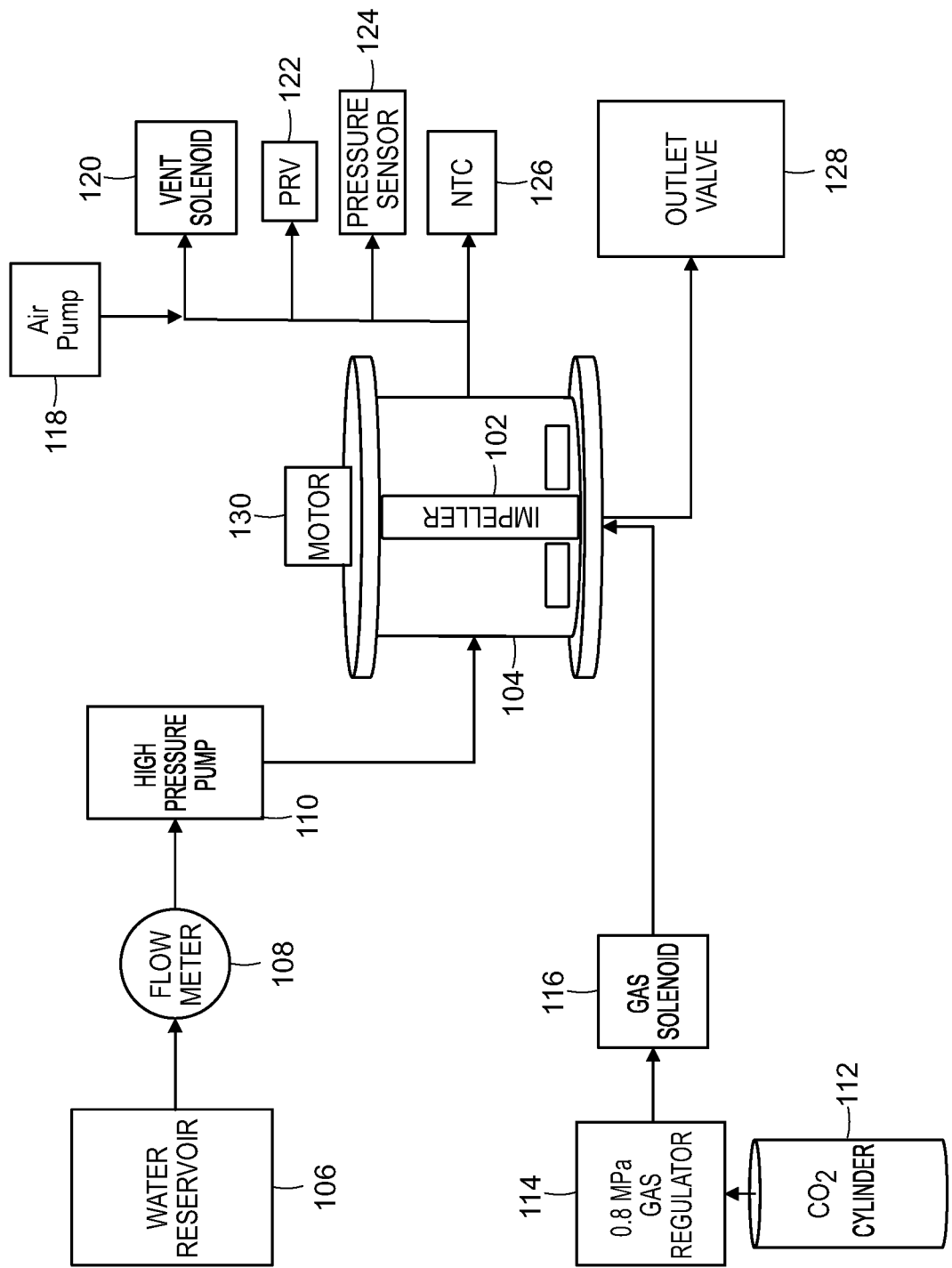
FIG. 1 is a schematic view of one embodiment of a carbonation system.

Certain embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various illustrative systems, devices, and methods of beverage carbonation system flow control are provided. In general, a carbonation system is configured to form a carbonated fluid and dispense the carbonated fluid in a controlled manner. The carbonated fluid is dispensed into a container, such as a bottle, a cup, or other container. The carbonated fluid is formed in a chamber of the carbonation system with pressure in the chamber being higher (e.g., significantly higher) than atmospheric pressure due to the use of a pressurized gas (carbon dioxide) in forming the carbonated fluid. If the carbonated fluid is dispensed from the chamber and out of the carbonation system while the pressure in the chamber is too high above atmospheric pressure, the carbonated fluid will flow too quickly out of the chamber and spray out of the carbonation system, which causes messy splatter and/or causes at least some of the carbonated fluid to not be neatly dispensed into the container. Alternatively, a valve configured to enable opening against the high chamber pressure may be used, but such a valve may require an expensive and high-power actuator, which, in addition to adding cost, may materially disadvantage the function of a carbonation system.

To address this potential problem, an amount of pressure may be vented from the chamber before beginning to dispense the carbonated fluid. However, it may still be desirable to maintain an amount of pressure (e.g., a low pressure) in the chamber during the dispensing of the carbonated fluid to assist in the dispensing. Assisting in this manner may reduce the time it takes to dispense the carbonate fluid, increasing user satisfaction, and may save cost in employing other means to reduce the dispensing time. Maintaining low pressure while the carbonated beverage is dispensed may be achieved, for example, by inputting (e.g., forcing) gas into the chamber (e.g., above the water level). For example, an air pump may pump air into the chamber, or $CO_2$ may be forced into the chamber from a pressurized $CO_2$ canister (e.g., via a regulator). A gas that imposes a force on the chamber to assist in dispensing carbonated fluid (e.g., $CO_2$ from a $CO_2$ canister or air from an air pump) may be referred to herein as a "forcing gas."

At some points relative to the dispensing of the carbonated fluid, the venting of pressure stops and the inputting of a forcing gas begins. If the timing between the stopping of the venting, the start of inputting of the forcing gas, and the start of the dispensing of the carbonated fluid is not controlled properly, carbonated fluid may be dispensed relatively unevenly over a period of time corresponding to these events. For example, if the dispensing begins after the venting stops, but before or at about the same time as the forcing gas starts being input, the flow rate may start at a first rate, slowly decline and then increase relatively abruptly as the initial impact of the forcing gas is felt, and then achieve a steadier state over time as the forcing gas continues to be input into the chamber. Such uneven dispensing may be undesirable for user satisfaction, and could result in splatter or sputter as described herein. As another example, if an output valve through which the carbonated fluid passes opens too soon, e.g., before a sufficient amount of venting of pressure from the chamber, headspace pressure in the chamber may be too high, causing a burst of the carbonated fluid to be ejected at too high a rate. However, after such an initial burst, the resulting expansion of the headspace reduces the excess pressure and the flow rate will rapidly fall off. As yet another example, if the venting of pressure continues for too long, the headspace pressure may fall to a very low value, possibly even low enough to equal atmospheric pressure. If dispensing starts with a very low headspace pressure, only gravity is available to drive flow, and the result will be a very weak dispense that gets even weaker as the head pressure itself falls towards zero. Even if additional gas is input into the chamber, there would be a period of low and variable dispense flow before the headspace pressure is brought up sufficiently by the input gas to drive a good dispense flow rate.

Configuring a carbonation system to dispense the carbonated fluid in a controlled manner as described herein may prevent the carbonated fluid from flowing too quickly, slowly, or unevenly out of the chamber, and may allow for the carbonated fluid to be dispensed at a substantially steady flow from a start of dispensing to an end of dispensing without any sputtering, whereas such sputtering otherwise may cause droplets of the carbonated fluid to splatter outside of the container.

In an illustrative embodiment, the carbonation system is configured to begin dispensing the carbonated fluid before excess pressure has been released completely from the chamber. In other words, the carbonation system is configured to begin dispensing the carbonated fluid with the pressure in the chamber being a desired pressure above atmospheric pressure at which to dispense the carbonated fluid. The pressure in the chamber being above atmospheric pressure will urge, with the assistance of gravity, the carbonated fluid in the chamber to flow out of the chamber and out of the carbonation system. The carbonation system can therefore use the pressure present in the chamber as a product of forming the carbonated fluid to dispense the carbonated fluid in a controlled manner. Using the present pressure in this manner may save time over waiting until pressure in the chamber has reached atmospheric pressure before beginning to dispense the carbonated fluid and only then starting to input gas into the chamber.

The carbonation system may include an outlet through which the carbonated fluid is configured to exit the carbonation system. The outlet may be configured and/or controlled to be closed until the pressure in the chamber has decreased to a preset pressure threshold, and to open at such time to allow the pressure in the chamber to drive flow of the carbonated fluid out of the chamber. In such embodiments, the carbonated fluid will therefore not begin being dispensed until the preset pressure threshold has been met, thereby allowing the carbonated fluid to be dispensed in a controlled manner. The preset pressure threshold can correspond to the pressure aimed to be maintained throughout the dispensing of the carbonated fluid.

Some carbonation systems allow different types and sizes of beverages to be formed on demand, in which case pressure in the chamber may not be the same for every formation of a carbonated fluid, e.g., because different amounts of liquid and/or gas may be present in the chamber to form a particular carbonated fluid having particular parameters related to, e.g., carbonation level, volume, source liquid, etc. Basing a start of dispensing on a comparison of pressure in the chamber with the preset pressure threshold can account for these different chamber pressures across the formation of different carbonated fluids. Additionally, components of a carbonation system may experience wear and tear over time due to repeated use. Thus, whether or not a carbonation system allows different types and sizes of carbonated fluids to be formed, basing a start of dispensing on a comparison of pressure in the chamber with the preset pressure threshold may help ensure that dispensing occurs neatly and consistently over time even if any one or more components of the carbonation system has experienced wear and tear that affects the formation of the carbonated fluid.

Instead of the outlet remaining closed until a preset pressure threshold is met, the outlet can be configured to be closed until a predetermined amount of time has passed since occurrence of a predetermined event. A start of dispensing can thus be based on whether a preset time threshold has been met, based, for example, on empirical data. The pressure in the chamber can be presumed to have decreased enough after the predetermined amount of time has passed since the predetermined event occurred to allow dispensing to occur neatly because the mixing process can be presumed to be performed the same way each time a carbonated fluid is formed. The predetermined event can be, for example, an event that occurs in every process of forming a carbonated fluid, such as a motor being activated to mix the liquid and $CO_2$ in the chamber, the motor being stopped, a start of when liquid begins being added to the chamber, when liquid stops being added to the chamber, a start of when $CO_2$ begins being added to the chamber, when $CO_2$ stops being added to the chamber, or another event. For another example, the predetermined event can be when a user triggers a start of the beverage dispensing process, such as by pressing a button on the carbonation system, providing an input to a user interface of the carbonation system, or by otherwise triggering the beverage dispensing process.

In some embodiments, the carbonation system can be configured to consider each of pressure and time in starting dispensing of the carbonated fluid. In such embodiments, a one of the preset pressure threshold and the preset time threshold that is met first is configured to trigger the start of dispensing, e.g., trigger the opening of the outlet. Allowing either pressure or time to trigger the start of dispensing may account for differences in different mixing processes due to various factors such as one or more components of the carbonation system experiencing wear and tear that may affect timing of the mixing process, differently sized and/or differently composed carbonated fluid being formed, or other factors.

The pressure in the chamber, e.g., in the headspace thereof after venting and the start of dispensing, will typically not be sufficient to drive flow of all of the carbonated fluid out of the chamber. A gas can thus be introduced into the chamber after dispensing has already started via the pressure in the chamber. The gas is configured to urge the carbonated fluid out of the chamber. The gas may be introduced into the chamber according to a predetermined pressure profile or a predetermined timing profile, thereby helping to dispense the carbonated fluid in a controlled manner. The predetermined time or pressure profile can include compensation for the variation of gravity head pressure that can also contribute to dispense flow rate, where gravity head pressure inherently falls towards zero during dispense. In some embodiments, the gas to drive flow of the carbonated fluid can be $CO_2$. The gas can thus be the same type of gas mixed with the liquid to form the carbonated fluid and can be introduced into the chamber from the same gas source that provided the gas to the chamber for mixing with the liquid. The carbonation system therefore need not include additional component(s) to allow for gas to be used in driving a flow of carbonated fluid out of the carbonation system since the carbonation system already includes component(s) to introduce the gas into the chamber. If the gas is the same type of gas mixed with the liquid to form the carbonated fluid, the gas may be introduced differently into the chamber for driving flow of the carbonated fluid for dispensing. For example, the gas may be introduced above the liquid for driving flow and introduced under the liquid for carbonation. The carbonation system can include component(s) to facilitate this different introduction of the gas, such as by including a three-way valve. In other embodiments, the gas to drive flow of the carbonated fluid can be air introduced into the chamber. Using air instead of the same gas ($CO_2$) used in forming the carbonated fluid allows the gas ($CO_2$) to be reserved for use in forming carbonated fluids so the gas source ($CO_2$ source) may need less frequent replacement due to low or no gas remaining in the gas source.

The systems, devices, and methods described herein are not limited to carbonation systems in which a liquid is mixed with $CO_2$ to form a treated fluid in the form of a carbonated fluid intended to be a beverage. A beverage carbonation system is one example of a treatment system to which the systems, devices, and methods described herein apply. Other treatment systems are generally configured and used similar to the carbonation systems described herein except instead of mixing $CO_2$ with a liquid, a different gas is mixed with the liquid. The resulting fluid is a treated fluid but is not a "carbonated" fluid.

FIG. 1 illustrates one embodiment of a carbonation system 100 configured to form a carbonated fluid. The carbonation system 100 of this illustrated embodiment includes an agitator (labelled "impeller" in FIG. 1) 102 and includes a chamber 104 in which the agitator 102 is disposed and configured to rotate to form the carbonated fluid. Various embodiments of agitators and chambers are described, for example, in Intl. Pat. App. No. PCT/CN2022/092688 entitled "Agitator For A Carbonation System" filed May 13, 2022, which is hereby incorporated by reference in its entirety.

The carbonation system 100 also includes a liquid source 106 configured to be a source of liquid for mixing in the chamber 104, a flow meter 108 configured to regulate an amount of liquid that flows from the liquid source 106 to the chamber 104, and a high pressure pump 110 configured to pump liquid from the liquid source 106 to the chamber 104. The liquid is water in this illustrated embodiment such that the liquid source 106 is a water reservoir, but another liquid can be used, such as juice. The pump for liquid is a high pressure pump 110 in this illustrated example but can be another type of pump, such as a low pressure, high flow rate pump.

The carbonation system 100 also includes a gas source 112 configured to be a source of gas for mixing in the chamber 104, a gas regulator 114 configured to regulate an amount of gas that flows from the gas source 112 to the chamber 104, and a gas solenoid valve 116 configured to open and close to selectively allow the gas to flow from the gas source 112 to the chamber 104. The gas is $CO_2$ in this illustrated embodiment such that the gas source 112 is a $CO_2$ source in the form of a $CO_2$ cylinder, but another gas can be used (in which case, as mentioned above, the fluid dispensed would not be a "carbonated" fluid but would be a treated fluid). The gas regulator 114 is an 0.8 MPa gas regulator in this illustrated embodiment but other gas regulators can be used. For example, the gas regulator 114 can be a 0.65 MPa gas regulator. The gas regulator 114 may be configured to allow a high flow rate of gas when it is open so that the operation of the process takes less time as compared to use of a low flow rate of gas.

The carbonation system 100 also may include an air pump 118 configured to drive a flow of the carbonated fluid out of the chamber 104 through an outlet valve 128. The outlet valve 128 is configured to selectively open to allow the carbonated fluid to exit the chamber 104 and out of the carbonation system 100, e.g., for dispensing into a container such as a cup, a bottle, etc. The outlet valve 128 can be of a type that allows modulation of the flow passage through the outlet valve 128 such that the outlet valve 128 can be used as a control element configured to manage the flow rate. In particular, the opening of the outlet valve 128 can be configured to avoid creating a sudden jet or burst of flow at the start of dispensing. The air pump 118 is configured to pump air into the chamber 104 such that, with the outlet valve 128 open, the carbonated fluid in the chamber 104 is forced out of the chamber 104 and out of the carbonation system 100 through the outlet valve 128. As discussed further herein, a pressure within the chamber 104 in combination with resistance of an output channel is configured to drive a flow of the carbonated fluid out of the chamber 104 through the outlet valve 128 before the air pump 118 is actuated to pump air into the chamber 104.

The carbonation system 100 also includes a vent solenoid valve 120 configured to allow excess pressure to be released from the chamber 104 with the vent solenoid valve 120 open, a pressure relief valve (PRV) 122, a pressure sensor 124 configured to measure pressure in the chamber 104, and a temperature sensor 126 configured to measure temperature in the chamber 104. The temperature sensor 126 may be a negative temperature coefficient (NTC) thermistor as in this illustrated embodiment, but another type of temperature sensor can be used. In some embodiments, the temperature sensor 126 is omitted.

The carbonation system 100 may also include a motor 130 configured to drive the rotation of the agitator 102. The motor 130 is shown disposed outside of and above the chamber 104 in this illustrated embodiment but a first portion of the motor 130 can be disposed inside the chamber 104 and a second portion of the motor 130 can be disposed outside of the chamber 104. Various embodiments of motors are described, for example, in previously mentioned Intl. Pat. App. No. PCT/CN2022/092688 entitled "Agitator For A Carbonation System" filed May 13, 2022.

Figure 2:
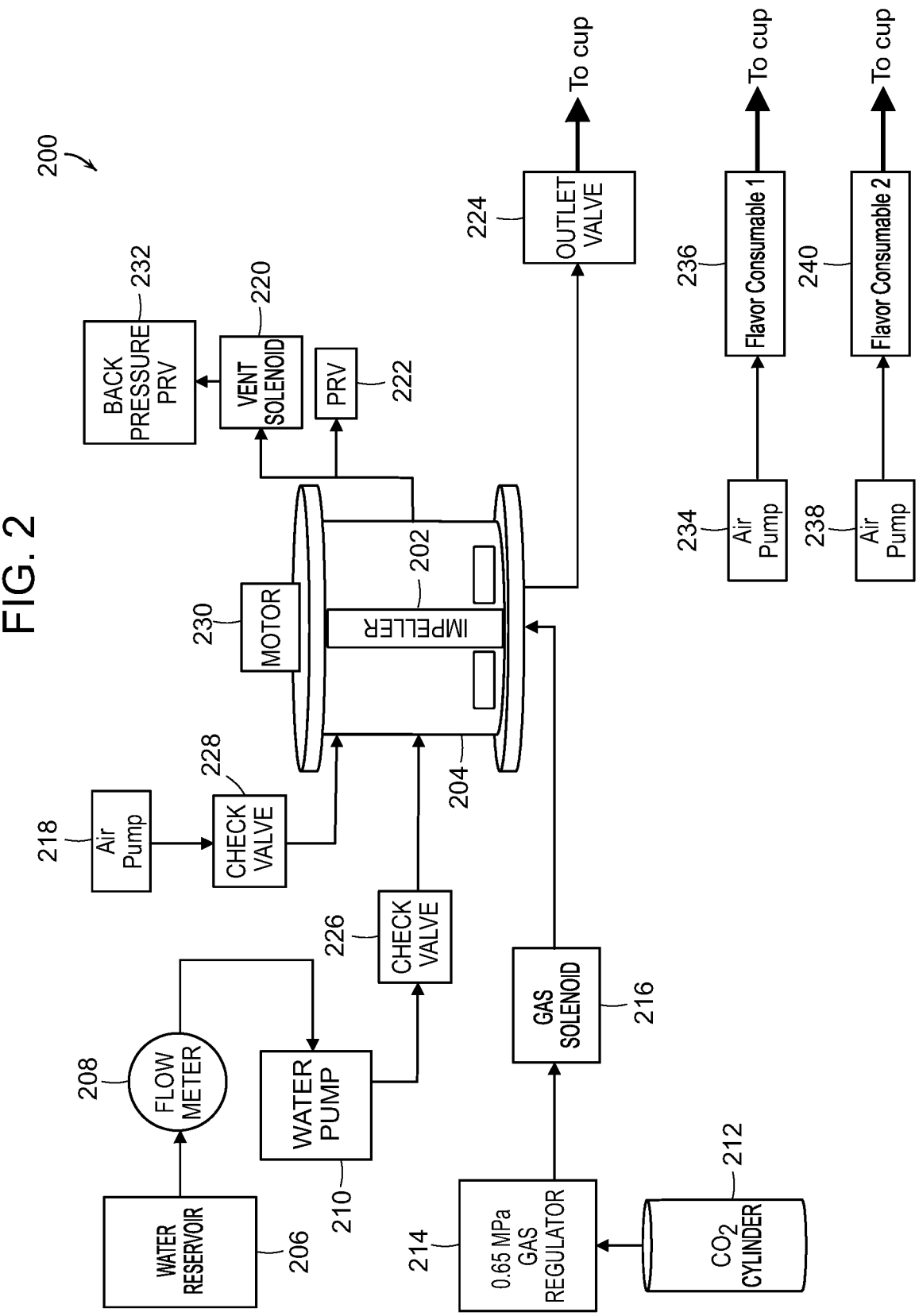
FIG. 2 is a schematic view of another embodiment of a carbonation system.

FIG. 2 illustrates another embodiment of a carbonation system 200 configured to form a carbonated fluid. The carbonation system 200 of this illustrated embodiment includes an agitator (labelled "impeller" in FIG. 2) 202 and includes a chamber 204 in which the agitator 202 is disposed and configured to rotate to form a carbonated fluid. The carbonation system 200 of FIG. 2 is generally configured and used similar to the carbonation system 100 of FIG. 1, e.g., includes a liquid source 206, a flow meter 208, a pump 210, a gas source 212, a gas regulator 214 configured to regulate an amount of gas that flows from the gas source 212 to the chamber 204, a gas solenoid valve 216, an outlet valve 224, a first air pump 218 configured to drive a flow of carbonated fluid out of the chamber through the outlet valve 224, a vent solenoid valve 220, a PRV 222, and a motor 230. As discussed further herein, a pressure within the chamber 204 is configured to drive a flow of the carbonated fluid out of the chamber 204 through the outlet valve 224 before the first air pump 218 is actuated to pump air into the chamber 204. The liquid is water in this illustrated embodiment such that the liquid source 206 is a water reservoir, but another liquid can be used, such as juice. The gas is $CO_2$ in this illustrated embodiment such that the gas source 212 is a $CO_2$ source in the form of a $CO_2$ cylinder, but another gas can be used. The gas regulator 214 is an 0.65 MPa gas regulator in this illustrated embodiment but other gas regulators can be used (e.g., as described above). The container into which the carbonated fluid is dispensed via the outlet valve 224 is a cup in this illustrated embodiment, but another type of container can be used.

The carbonation system 200 also includes a first check valve 226 disposed between the high pressure pump 210 and the chamber 204. The first check valve 226 is configured to allow the liquid to flow only in a direction toward the chamber 204.

The carbonation system 200 also includes a second check valve 228 disposed between the first air pump 218 and the chamber 204. The second check valve 228 is configured to allow the air to flow only in a direction toward the chamber 204.

The carbonation system 200 also includes a back pressure PRV 232 in series with the vent solenoid valve 220 that is configured to regulate headspace pressure in the chamber 204 at a chosen value even if the vent solenoid valve 220 remains open. In this way, the timing of closing the vent solenoid valve 220 may not be critical to the correct operation of the system for dispensing. That is, the back pressure PRV 232 is configured to restrict a rate of gas escape from the chamber 204 and thereby avoid a very high rate of depressurization that can cause agitation as residual bubbles expand in fluid in the chamber 204. The back pressure PRV 232 is also configured to limit the chamber 204 pressure even if the air pump 218 is unregulated, which may allow for a lower cost air pump 218 or the use of a separate pump control loop via a pressure sensor. In this way, the back pressure PRV 232 may allow a lower system cost to be achieved with the system being configured to effectively control dispensing.

The carbonation system 200 also includes a second air pump 234, a first consumable 236, a third air pump 238, a second consumable 240. Each of the first and second consumables 236, 240 can include one or more additives including any of a variety of ingredients, including, for example, flavorants, colorants, vitamins, minerals, chemicals, other ingredients, or any suitable combination of the foregoing. The second air pump 234 is configured to cause a first additive(s) contained in the first consumable 236, e.g., a cup, a pouch, etc., to be dispensed into the cup (or other container). The third air pump 238 is configured to cause a second additive(s) contained in the second consumable 240, e.g., a cup, a pouch, etc., to be dispensed into the cup (or other container). The carbonation system 200 can be configured to allow a user to select which one or both of the first and second additives is dispensed into the cup (or other container) and/or to allow the user to select an amount of the selected additive(s) to be dispensed into the cup (or other container). The user may select no additive. The selected additive(s) can be dispensed into the cup (or other container) before the carbonated fluid is dispensed, after the carbonated fluid is dispensed, or simultaneously with the dispensing of the carbonated fluid. Various embodiments of carbonation systems configured to add additive(s) are described, for example, in U.S. patent application Ser. No. 17/744,459 entitled "Flavored Beverage Carbonation System" filed May 13, 2022, which is hereby incorporated by reference in its entirety. The same or similar physical components, functional components and techniques described in such application with respect to flavorants may be applied to other types of additives (e.g., as described herein).

Figure 3:
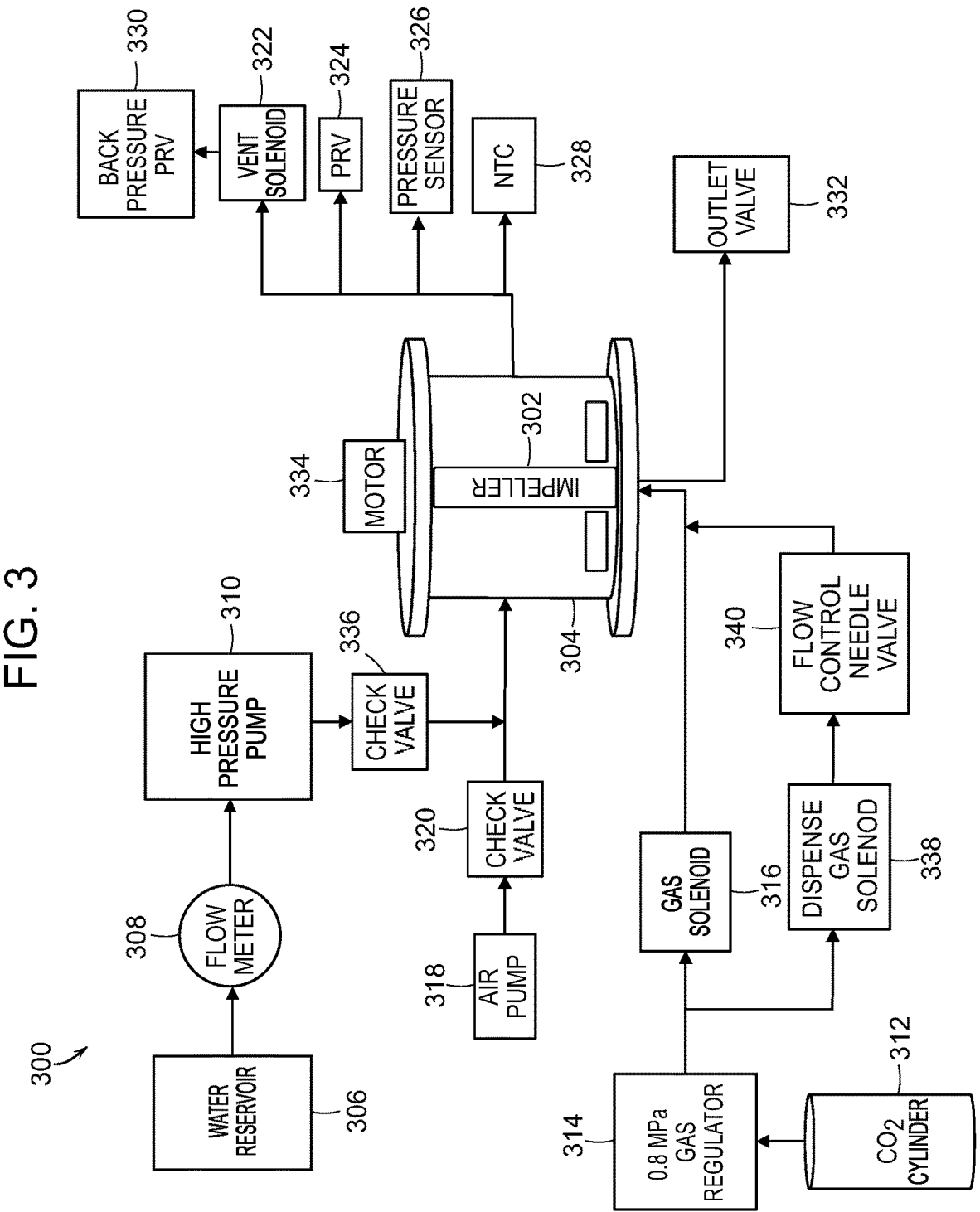
FIG. 3 is a schematic view of yet another embodiment of a carbonation system.
Figure 4:
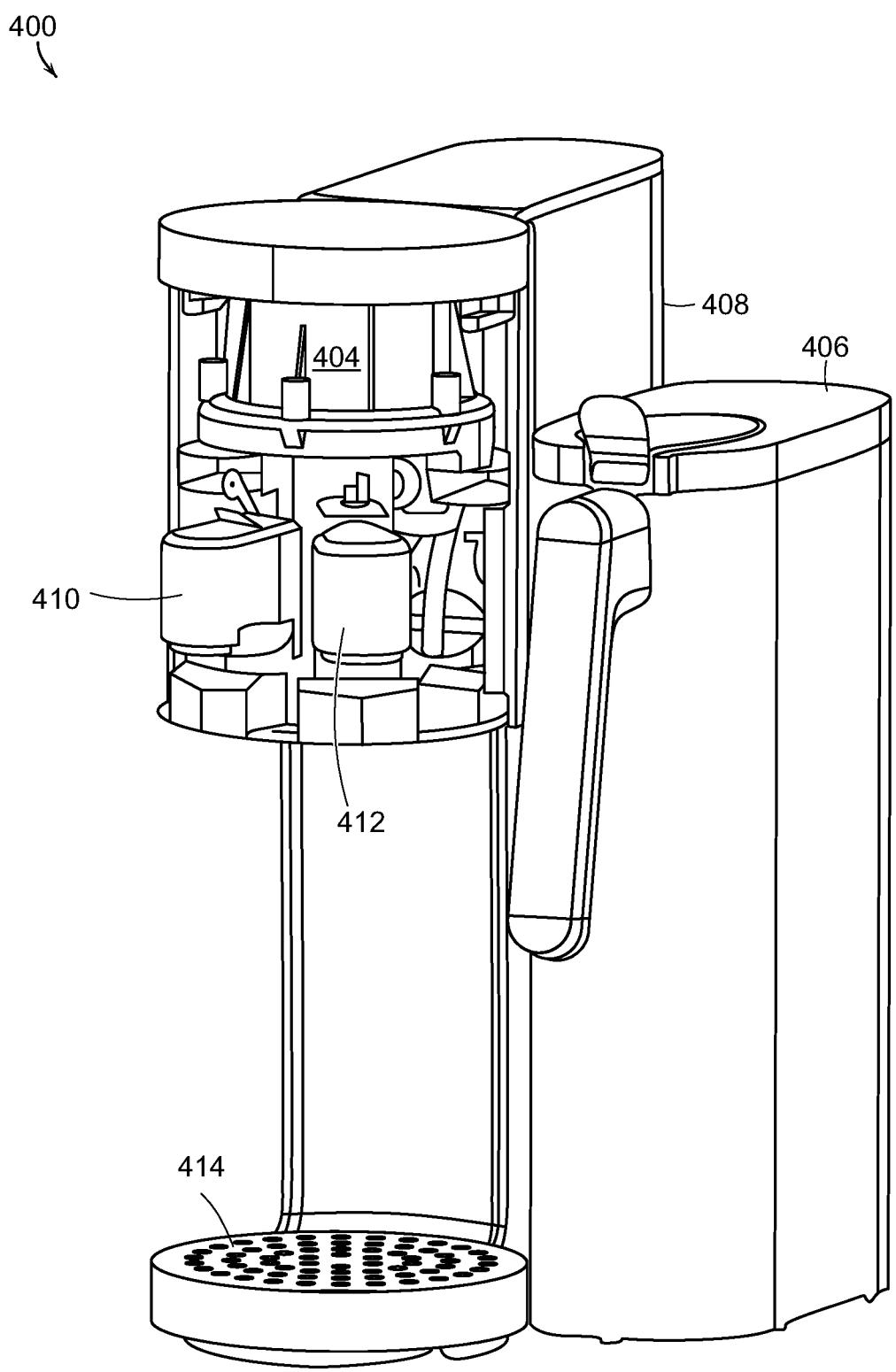
FIG. 4 is a partial perspective view of another embodiment of a carbonation system.
Figure 5:
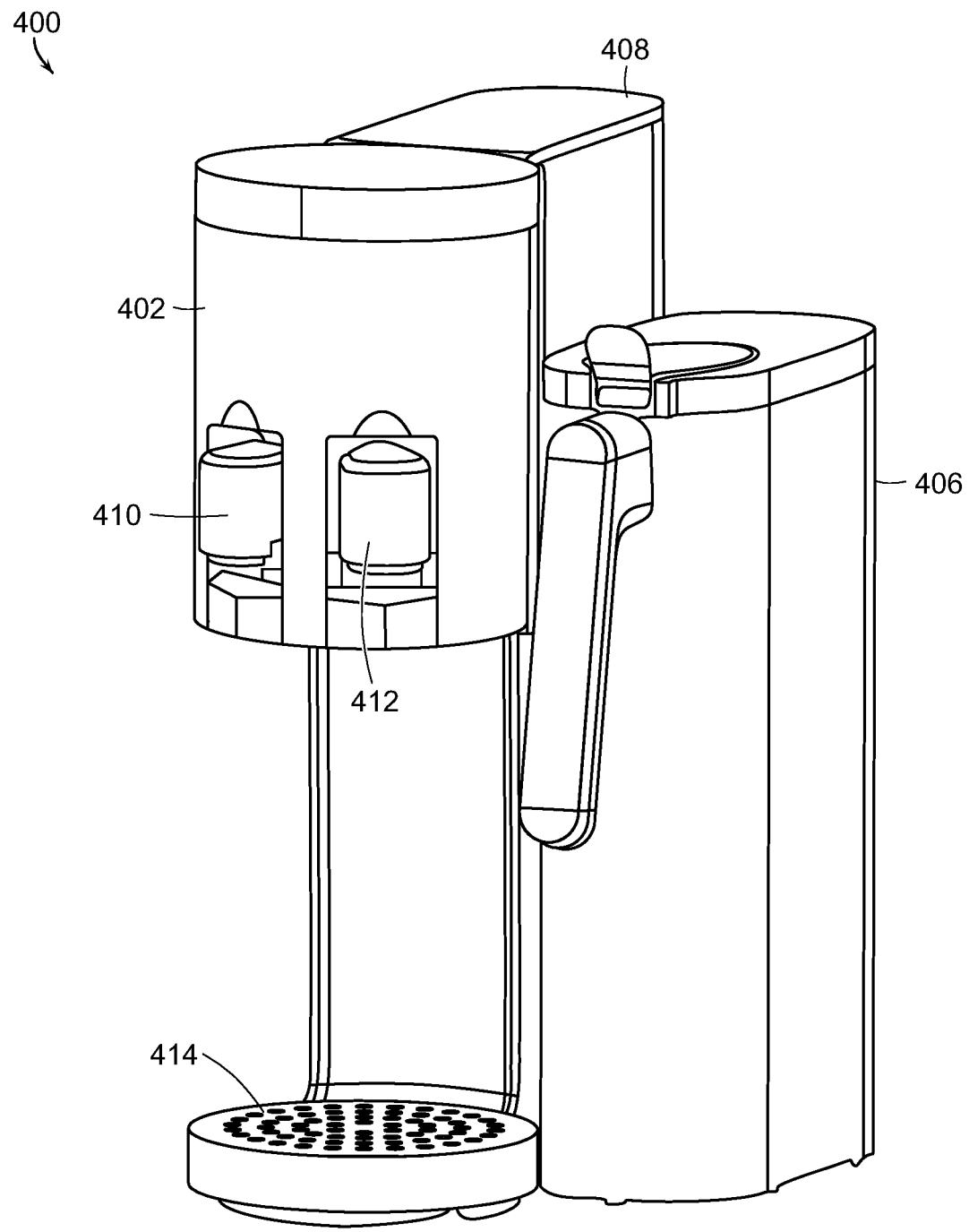
FIG. 5 is another perspective view of the carbonation system of FIG. 4.

The carbonation system 200 in the illustrated embodiment of FIG. 2 is configured to add one or more additives, but in other embodiments the carbonation system 200 can be configured to not add any additives. FIGS. 4 and 5 illustrate another example of a carbonation system 400 configured to add an additive. FIGS. 1 and 3 illustrate examples of carbonation systems 100, 300 that do not add any additives.

The carbonation systems 100, 200 of FIGS. 1 and 2 each include an air pump 118, 218 configured to introduce air into their respective chambers 104, 204 to drive a flow of the carbonated fluid to dispense carbonated fluid through the outlet valve 128, 224. Using air in dispensing carbonated fluid re-enriches the chamber 104, 204 with air at every mixing cycle, which then affects the next mixing cycle. In the next mixing cycle, the chamber 104, 204 is mostly filled with air during its filling with the liquid, so the carbon dioxide gas cannot start to dissolve in the chamber 104, 204 during the filling cycle, but only in the next stage of the process when the gas regulator 114, 214 supplies gas, e.g., high pressure gas, into the chamber 104, 204. Air pumps 118, 218 are generally low cost, but a flow rate provided by the air pump 118, 218 must be equal than or greater to a dispense flow rate, e.g., greater than or equal to 2 L/min, to effectively dispense the carbonated fluid. In some embodiments, the air in a chamber may be vented during the filling of the liquid, for example, using the vent solenoid valve 120, 220.

In other embodiments, rather than using air (including its constituent gasses), a carbonation system can be configured to introduce a gas other than aire from a gas source into a chamber to dispense carbonated fluid through an outlet valve. In such embodiments, a pressure within the chamber is configured to drive a flow of the treated fluid out of the chamber through the outlet valve before the gas source, e.g., the gas source 112 of FIG. 1, the gas source 212 of FIG. 2, etc., is actuated to introduce gas into the chamber with a gas regulator, e.g., the gas regulator 114 of FIG. 1, the gas regulator 214 of FIG. 2, etc., that controle an injection rate of the gas into the chamber. In an illustrative embodiment, the gas source from which gas is introduced into the chamber for purposes of dispensing the carbonated fluid is the same gas source that supplies gas to the chamber for treating (e.g., mixing with) a liquid in the chamber, for example a $CO_2$ canister. Agitation may last for a shorter amount of time when using the treatment gas for dispensing instead of air since any treatment gas remaining in the chamber from a last carbonation-dispense cycle can start to dissolve in the chamber as soon as liquid starts to be introduced into the chamber, instead of waiting until filling with water is complete and/or agitation has started. For example, sufficient agitation may last 12 seconds when air is used for dispensing but last only 10 seconds when a gas from another gas source is used for dispensing. Also, the effective concentration of gas in the chamber's headspace may be increased in the absence of dilution by residual air introduced into the chamber during an earlier cycle to aid in dispensing.

The valve used in introducing the gas into the chamber for purposes of mixing can be the same valve used in introducing the gas into the chamber for purposes of dispensing, or different valves may be used. If the same valve is used, the valve can be a proportional valve that has a range of flow settings or a digital valve that opens in pulses to accommodate different gas introductions for mixing and for dispensing. Using different valves can allow for a valve to be used in introducing the gas into the chamber for purposes of dispensing that is adapted for use with much lower target pressures than used in introducing gas for purposes of mixing since less gas is typically introduced for dispensing than for mixing, in which a larger amount of gas is typically introduced into the chamber very quickly.

FIG. 3 illustrates one embodiment of a carbonation system 300 configured to form a carbonated fluid and configured to use gas in dispensing the carbonated fluid. The carbonation system 300 includes an agitator (labelled "impeller" in FIG. 3) 302 and includes a chamber 304 in which the agitator 302 is disposed and configured to rotate to form a carbonated fluid. The carbonation system 300 of FIG. 3 is generally configured and used similar to the carbonation systems 100, 200 of FIGS. 1 and 2 except for the dispensing using gas, e.g., includes a liquid source 306, a flow meter 308, a pump 310 (e.g., a high pressure pump), a gas source 312, a gas regulator 314 configured to regulate an amount of gas that flows from the gas source 312 to the chamber 304, a first gas solenoid valve 316, an air pump 318, a first check valve 320, a vent solenoid valve 322, a PRV 324, a pressure sensor 326, a temperature sensor 328, a back pressure PRV 330, an outlet valve 332, a motor 334, and a second check valve 336. The liquid is water in this illustrated embodiment such that the liquid source 306 is a water reservoir, but another liquid can be used, such as juice. The gas is $CO_2$ such that the gas source 312 is a $CO_2$ cylinder in this illustrated embodiment but another gas can be used. The gas regulator 314 is an 0.8 MPa gas regulator in this illustrated embodiment but other gas regulators can be used (e.g., as described elsewhere herein). The temperature sensor 328 is an NTC thermistor in this illustrated embodiment, but another type of temperature sensor can be used, or a temperature sensor may be omitted. The air pump 318 and the first check valve 320 may be omitted in embodiments in which gas from a non-air source (e.g., from a $CO_2$ canister) is used to aid in dispensing the carbonated fluid.

The carbonation system 300 also includes a second gas solenoid valve 338 and a flow control needle valve 340 that are configured to allow gas to flow from the gas source 312 into the chamber 304 to cause carbonated fluid to exit the chamber 304 for dispensing through the outlet valve 332. As discussed further herein, a pressure within the chamber 304 is configured to drive a flow of the carbonated fluid out of the chamber 304 through the outlet valve 332 before the gas source 312 is actuated to introduce gas into the chamber 304.

FIGS. 4 and 5 illustrate another embodiment of a carbonation system 400 configured to form a carbonated fluid. A cover 402 of the carbonation system 400 is omitted in FIG. 4 to show a chamber 404 of the carbonation system. Various embodiments of chambers are described, for example, in previously mentioned Intl. Pat. App. No. PCT/CN2022/092688 entitled "Agitator For A Carbonation System" filed May 13, 2022. The carbonation system 400 can have a variety of configurations, such as a configuration similar to the carbonation system 100 of FIG. 1, the carbonation system 200 of FIG. 2, or the carbonation system 300 of FIG. 3.

The carbonation system 400 includes a liquid source 406 in the form of a pitcher configured to be releasably coupled to a housing 408 of the carbonation system 400 in which the chamber 404 is located. Other liquid sources can be used, and the pitcher 406 can have any of a variety of configurations. A check valve, such as the first check valve 226 of FIG. 2 or the second check valve 336 of FIG. 3, can be configured to automatically open in response to the pitcher 406 being seated in a base (not shown) of the carbonation system 400 to allow liquid, e.g., water, in the pitcher 406 to flow out of the pitcher 406 and into the chamber 404. Various embodiments of carbonation systems configured to be in selective fluid communication with a liquid reservoir such as a pitcher are described, for example, in previously mentioned U.S. patent application Ser. No. 17/744,459 entitled "Flavored Beverage Carbonation System" filed May 13, 2022.

The chamber 404 is configured to receive liquid therein through a liquid inlet (obscured in the figures) operably coupled to the liquid source 406 (e.g., through liquid tubing and/or other components) and is configured to receive gas therein through a gas inlet (obscured in the figures) operably coupled to a gas source (obscured in the figures) of the carbonation system 300 (e.g., through gas tubing and/or other components). Excess gas not dispensed from the chamber 404 through an outlet valve is configured to exit the chamber 404 through an outlet (obscured in the figures) operably coupled to a vent solenoid (obscured in the figures), such as the vent solenoid 120 of FIG. 1, the vent solenoid 220 of FIG. 2, the vent solenoid 322 of FIG. 3, etc.

The carbonation system 400 in this illustrated embodiment is configured to selectively dispense first and second additives from first and second consumables 410, 412, respectively, into a container placed on a container base 414 of the carbonation system 400 that can also serve as a drip tray. However, as discussed above, the carbonation system 400 can be configured to add no additive.

The carbonation system 400 also includes a processor (obscured in FIGS. 4 and 5) disposed in the housing 408. In general, the processor is configured to execute instructions stored in a memory (obscured in FIGS. 4 and 5) disposed in the housing 408 to cause various actions to occur, such as opening of an outlet valve of the carbonation system 400, causing the first additive(s) to be dispensed from the first additives) consumable 410, causing the second additive(s) to be dispensed from the second consumable 412, causing an alert (e.g., an illuminated light, an emitted sound, etc.) to be provided to a user when the carbonation fluid has finished being dispensed from the carbonation system 400, etc. Other embodiments of treatment systems (e.g., the carbonation system 100 of FIG. 1, the carbonation system 200 of FIG. 2, the carbonation system 300 of FIG. 3, etc.) described herein similarly include a processor.

Figure 6:
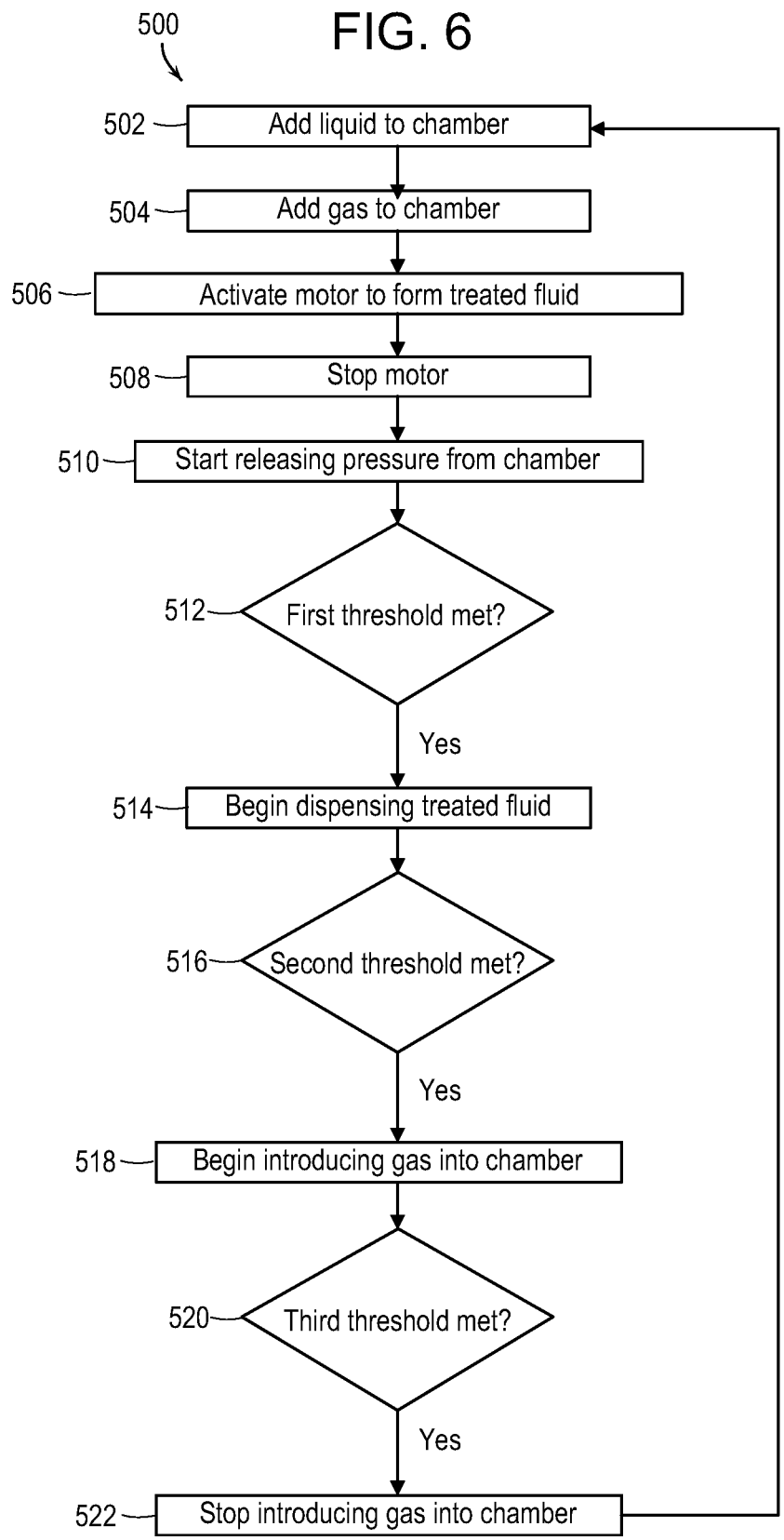
FIG. 6 is a flowchart of one embodiment of a method of forming a treated fluid.
Figure 7:
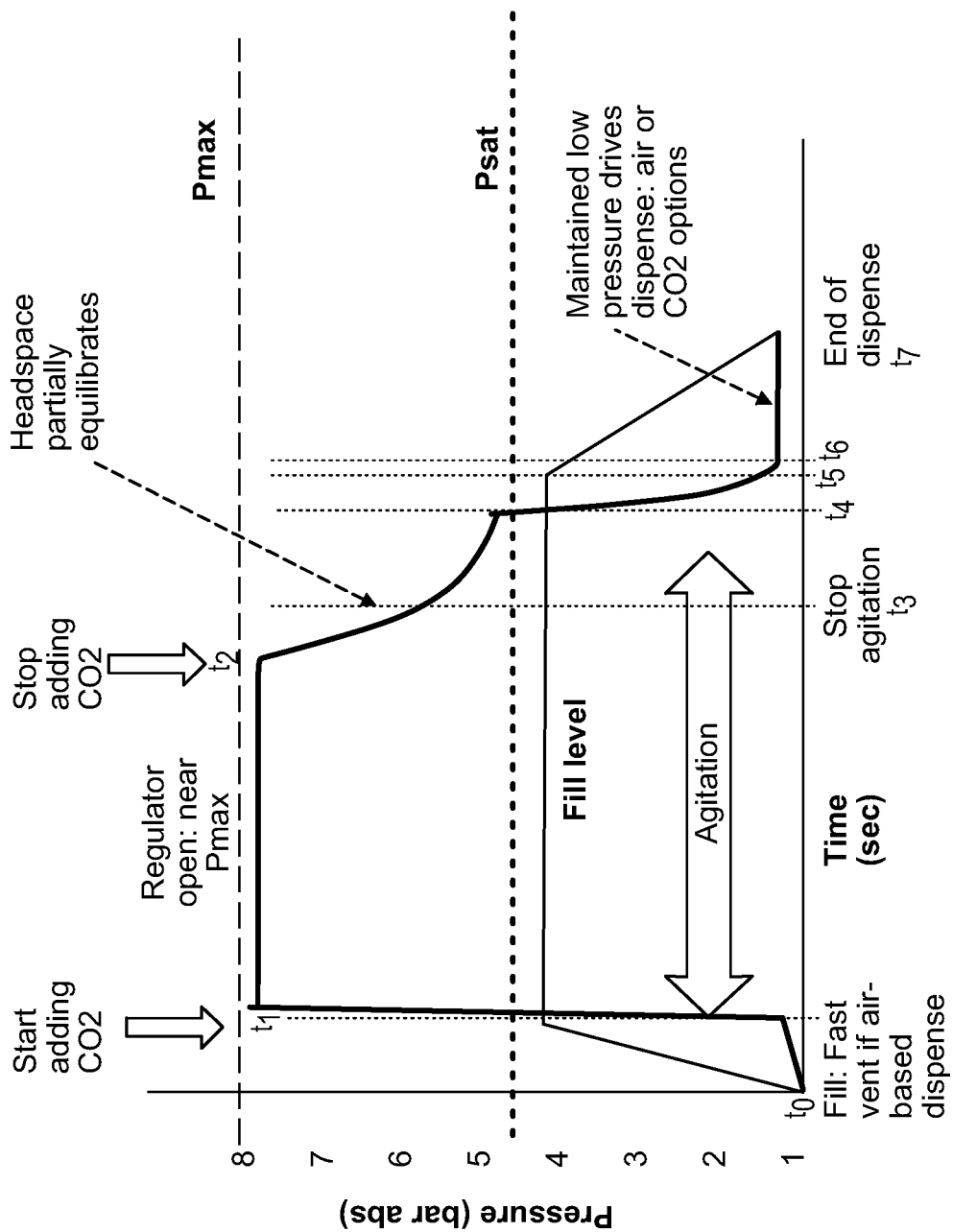
FIG. 7 is one embodiment of a graph showing pressure versus time for the method of FIG. 6.

FIG. 6 illustrates one embodiment of a method 500 of mixing a liquid (e.g., water, juice, etc.) and a gas (e.g., $CO_2$, etc.) to form a treated fluid using a treatment system such as a carbonation system (e.g., the carbonation system 100 of FIG. 1, the carbonation system 200 of FIG. 2, the carbonation system 300 of FIG. 3, the carbonation system 400 of FIGS. 4 and 5, etc.). As discussed herein, the liquid and the gas can be mixed in a chamber (e.g., the chamber 104 of FIG. 1, the chamber 204 of FIG. 2, the chamber 304 of FIG. 3, the chamber 404 of FIG. 4, etc.) using an agitator (e.g., the agitator 102 of FIG. 1, the agitator 202 of FIG. 2, the agitator 302 of FIG. 3, etc.) disposed in the chamber. The method 500 is discussed below with respect to FIG. 7, which illustrates a graph showing example operation of the method 500 with the gas being $CO_2$. The graph of FIG. 7 plots pressure (bar abs) versus time (sec) for one mixing cycle.

The method 500 includes adding 502 the liquid to the chamber from a liquid source starting at time zero $t_0$ and adding 504 the gas to the chamber from a gas source starting at a first time $t_1$ that is after time zero $t_0$. FIG. 7 shows between time zero $t_0$ and the first time $t_1$ that, due to the liquid being added 502 to the chamber, about 1 bar of pressure accumulates in this example in the chamber, e.g., in a headspace of the chamber, before the gas begins being added 504 at the first time $t_1$. This excess pressure in the chamber before the first time $t_1$ may reduce a maximum amount of achievable gas concentration if the chamber gas contains a significant fraction of air. The method 500 can include using a vent pathway via a vent solenoid (e.g., the vent solenoid 120 of FIG. 1, the vent solenoid 220 of FIG. 2, the vent solenoid 332 of FIG. 3, etc.) to minimize excess pressure in the chamber during the adding 502 and thus increase the achievable concentration of the treatment gas. That is, a vent solenoid may be opened during the adding of a liquid to the chamber to reduce pressure resulting from adding the liquid. The liquid begins being added 502 to the chamber before the gas begins being added 504 to the chamber in this illustrated embodiment and stops being added 502 to the chamber before the gas begins being added 504 to the chamber. In other embodiments, in particular those that result in the chamber already being enriched with the treatment gas as a result of using the same treatment gas for dispensing, the gas can begin being added 504 to the chamber before the liquid begins being added 502 to the chamber. In other embodiments, the gas and liquid can be added 502, 504 to the chamber at overlapping times, either fully overlapping or partially overlapping.

With the liquid and the gas in the chamber, a motor (e.g., the motor 130 of FIG. 1, the motor 230 of FIG. 2, the motor 334 of FIG. 3, etc.) is activated 506 at the first time $t_1$ to drive rotation of the agitator in the chamber and form a treated fluid. The motor can instead be activated 506 after the gas has started being added 504 to the chamber. The rotation of the agitator causes the gas and the liquid in the chamber to mix, as described herein, such that the gas dissolves in the liquid. The motor can be activated 506 in any number of ways. For example, the motor can be activated 506 automatically (e.g., by a processor of the treatment system that includes the motor, which in some embodiments may be a processor of the motor and in other embodiments may be a processor of the overall treatment system) in response to an end of each of the liquid and the gas being added 502, 504 to the chamber to ensure that all of the gas and the liquid intended to be in the chamber is in the chamber being mixing with the agitator begins.

The gas stops being added to the chamber at a second time $t_2$ during the agitation. Stopping the addition of the gas to the chamber allows a headspace in the chamber (e.g., a space above the liquid fill level in the chamber) to partially equilibrate with the liquid in the chamber. As shown in FIG. 7, the pressure in the chamber is substantially maintained at a level, which in this illustrated embodiment is just under 8 bars, from the start of adding 504 of the gas to the chamber at the first time $t_1$ to when the gas stops being added to the chamber at the second time $t_2$. In some embodiments, the pressure in the chamber may be maintained at a different level, for example, 6.5 bars, from the start of adding 504 of the gas to the chamber at the first time $t_1$ to when the gas stops being added to the chamber at the second time $t_2$. Further, in other embodiments, the pressure in the chamber can fluctuate up and down during the addition of the gas to the chamber from the first time $t_1$ to the second time $t_2$. The processor of the treatment system can be configured to adjust the timing and quantity of gas added to reach a target dissolved gas concentration ready for dispensing.

The motor is thereafter stopped 508 at a third time $t_3$ to stop causing the agitator's rotation. FIG. 7 shows that agitation continues for an amount of time past the third time $t_3$ while the agitator and mass of agitated fluid slows to fully stop rotating and settle before dispensing of the treated fluid. Allowing the treated fluid to settle permits gas bubbles to separate from the liquid before the chamber's headspace pressure is released. The motor can be configured to stop 508 in any of a variety of ways. For example, the motor can be configured to drive the agitator's rotation for a predetermined amount of time. A processor of the treatment system can be configured to determine whether the predetermined amount of time has passed, e.g., by using a counter or other timer. For another example, the motor can be configured to drive the agitator's rotation until a threshold condition is met for at least one measured parameter, such as temperature in the chamber or pressure in the chamber. A rate of change of the at least one measured parameter can be used as the measure of approach to equilibrium and hence the completion of treatment. In the example of pressure, the rate of change of pressure can be measured after the addition of gas to the chamber has stopped. A processor of the treatment system can be configured to determine whether the threshold condition has been met, e.g., by comparing a pressure measured with a pressure sensor (e.g., the pressure sensor 124 of FIG. 1, the pressure sensor 326 of FIG. 3, etc.) with a threshold pressure value, by comparing a temperature measured with a temperature sensor (e.g., the temperature sensor 126 of FIG. 1, the temperature sensor 328 of FIG. 3, etc.) with a threshold temperature value, etc. The processing of the thresholds can include the use of derivatives or combinations of the measurements to determine the optimal trigger point.

The headspace continues to partially or fully equilibrate in pressure after the motor has been stopped 508 and the agitator has fully stopped rotating and before pressure starts being released 510 from the chamber, e.g., to atmosphere through a vent solenoid (e.g., the vent solenoid valve 120 of FIG. 1, the vent solenoid valve 220 of FIG. 2, the vent solenoid valve 322 of FIG. 3, etc.) or to a second chamber, at a fourth time $t_4$. The pause between the complete stopping of the agitator's rotation of the start of pressure release 510 can allow the treated fluid in the chamber to be calm with bubbles having risen to the headspace in the chamber. Starting to release 510 pressure from the chamber prior to starting dispensing of the treated fluid helps prevent the treated fluid from exiting the chamber at a very high rate that would prevent the treated fluid from being neatly dispensed into the container.

While pressure is being released 510 from the chamber and before gas is introduced 518 into the chamber to drive dispensing of the treated fluid out of the chamber to a container (e.g., a cup, a bottle, etc.), a pressure in the chamber drives flow of the treated fluid to begin 514 out of the chamber and out of the treatment system to the container at a fifth time $t_5$. The fill level in the chamber thus starts decreasing at the fifth time $t_5$, as shown in FIG. 7. As also shown in FIG. 7, agitation of the treated fluid stopped before the fifth time $t_5$, so the treated fluid is not moving excessively within the chamber when dispensing begins 514. As discussed herein, the treated fluid exits the treatment system to a container (e.g., a cup, a bottle, etc.) through an outlet valve of the treatment system that has been opened, such as through the outlet valve 128 of FIG. 1, the outlet valve 224 of FIG. 2, the outlet valve 332 of FIG. 3, etc. The pressure in the chamber when the outlet is opened allows the treated fluid to begin 514 to flow out of the chamber toward and through the outlet valve due to a pressure differential between atmospheric pressure outside the chamber and pressure higher than atmospheric pressure in the chamber. The chamber has an opening at a bottom thereof through which the treated fluid is configured to flow toward the outlet valve. Gravity thus assists the flow of the treated fluid out of the chamber toward the outlet valve.

The outlet valve opens to allow dispensing to begin 514 in response to a determination 512 (e.g., determined by the processor of the treatment system) that a first threshold has been met. In one embodiment, the first threshold is a pressure threshold. In such an embodiment, a pressure within the chamber is compared with a first predetermined threshold pressure value to determine 512 whether the first threshold has been met. The first predetermined threshold pressure value can be, for a variety of examples, about 0.03 bar gauge, about 0.05 bar gauge, or about 0.1 bar gauge. A person skilled in the art will appreciate that a value may not be precisely at a value but nevertheless be considered to be about that value due to any number of factors, such as manufacturing tolerances and sensitivity of measurement equipment. In general, the first predetermined threshold pressure value depends on a resistance to flow of the outlet valve and a target flow rate. Low flow resistance and low driving pressure for dispensing of the treated fluid may retain the highest amount of dissolved gas in the dispensed treated fluid. The pressure within the chamber can be measured, for example, using a pressure sensor (e.g., the pressure sensor 124 of FIG. 1, the pressure sensor 326 of FIG. 3, etc.) configured to measure pressure in the chamber and that is communicatively coupled to a processor of the treatment system configured to control opening and closing of the outlet valve. If the pressure within the chamber is determined 512 to be equal to or less than the first predetermined threshold pressure value the first threshold is met, thereby allowing the pressure in the chamber to begin 514 to exit the chamber and flow out of the treatment system to the container. In this way, once the pressure has been lowered enough in the chamber, due to the pressure being released 510 from the chamber, the treated fluid can exit the chamber at a low enough rate to not spray out of the treatment system, e.g., to not flow out of the outlet valve too quickly.

The treated fluid is supersaturated with a dissolved gas, so controlling a pressure at which the treated fluid is dispensed allows for control of a very low pressure above atmospheric at which such a supersaturated solution is optimally dispensed. The pressure within the chamber can be measured relative to atmospheric pressure at this point in the method 500 to prevent deviations in behavior due to high or low atmospheric pressure due to weather or altitude.

In some embodiments, the first predetermined threshold pressure value can be selected to be a selected multiple of the gravitational head pressure of the treated fluid, such as 5× or 10× the gravitational head pressure. In this way, the forcing gas pressure does not cause a flow rate more than the selected multiple of the gravitational head pressure and the method 500 accounts for different geometries and fill levels of the chamber.

The first predetermined threshold pressure value may be adjusted by the system (e.g., the processor of the treatment system) to account for fluid temperature and/or to correct for changes in fluid viscosity. The first predetermined threshold pressure value may be adjusted based on a user's selection of size, e.g., selection of a beverage size, such that large and small sizes, e.g., large beverages and small beverages, are dispensed in a more consistent time period. The first predetermined threshold pressure value may be adjusted to account for the selected level of carbonation or supersaturation of the treated fluid. A highly treated fluid, e.g., a highly carbonated fluid, is more sensitive to treatment loss, e.g., loss of carbonation, during dispense than is a weakly-treated, e.g., weakly-carbonated, fluid. In order to deliver the highest possible treatment level, e.g., carbonation level, in the dispensed treated fluid, the dispensing flow rate may be reduced for very high carbonation levels relative to lower selected carbonation levels. The lower flow rate is caused by the adjustment to a lower threshold pressure for the start of dispensing and a lower forcing gas target pressure.

In another embodiment, the first threshold is a time threshold. In such an embodiment, when a time elapsed from an end of the motor being stopped 508 is determined 512 to be equal to or greater than a first predetermined threshold time value, the treated fluid in the chamber begins 514 to exit the chamber and flow out of the treatment system to the container. The predetermined threshold time value can be, for example, in a range of about 2 seconds to about 5 seconds. Elapsed time can be measured, for example, using a counter or other timer. Pressure within the chamber decreases after the motor has been stopped 508 at the third time $t_3$, as shown in FIG. 7. Thus, waiting to open the outlet valve until a predetermined amount of time has passed since the motor stopped 508 allows for the pressure within the chamber to have time to decrease.

Instead of the elapsed time being measured from a time the motor is stopped 508, a time elapsed from the motor being activated 506 can be used in determining 512 whether the first threshold has been met. If the time elapsed from the activation 506 of the motor is determined 512 to be equal to or greater than a first predetermined threshold time value, the treated fluid in the chamber begins 514 to exit the chamber and flow out of the treatment system to the container. The first predetermined threshold time value can be, for example, in a range of about 10 seconds to about 15 seconds. Pressure within the chamber will eventually decrease after the motor been activated 506 at the first time $t_1$, as shown in FIG. 7. Thus, waiting to open the outlet valve until a predetermined amount of time has passed since the motor was activated 506 allows for the pressure within the chamber to have time to decrease.

Instead of the elapsed time being measured, e.g., with a counter or other timer of the treatment system, from a time the motor is stopped 508 or from a time the motor was activated 506, a time elapsed from the gas stopping being added to the chamber can be used in determining 512 whether the first threshold has been met. If the time elapsed from when the gas stopped being added to the chamber is determined 512 to be equal to or greater than a first predetermined threshold time value, the treated fluid in the chamber begins 514 to exit the chamber and flow out of the treatment system to the container. The first predetermined threshold time value can be, for example, in a range from when the outlet valve opens to a range of about 10 seconds to about 15 seconds. Pressure within the chamber will start to decrease when the gas stops being added to the chamber at the second time $t_2$, as shown in FIG. 7. Thus, waiting to open the outlet valve until a predetermined amount of time has passed since the gas has stopped being added to the chamber and after the venting of the chamber has started allows for the pressure within the chamber to have time to decrease.

In some embodiments, only a pressure threshold is used as the first threshold. In other embodiments, only a time threshold is used as the first threshold. In still other embodiments, both pressure and time thresholds are used as the first threshold. In such embodiments, whichever threshold is met 512 first (pressure threshold or time threshold) triggers the start 514 of the dispensing using the pressure in the chamber to drive flow of the treated fluid.

With the treated fluid having started 514 to be dispensed at the fifth time $t_5$, pressure is still being released from the chamber, as shown in FIG. 7. At a sixth time $t_6$, which is after the fifth time $t_5$, gas starts 518 being forced into the chamber to drive a flow of the treated fluid out of the chamber. The vent solenoid (e.g., the vent solenoid 120 of FIG. 1, the vent solenoid 220 of FIG. 2, the vent solenoid 332 of FIG. 3, etc.) can be closed before the gas starts 519 being forced into the chamber so that the venting does not reduce the ability of the gas forced into the chamber to maintain the chamber pressure as the treated fluid continues to be dispensed. In this way, all of the gas forced into the chamber can be used to maintain the pressure and none of the gas forced into the chamber be lost by flow through the vent pathway. The gas forced into the chamber cooperates with gravity and residual headspace pressure in the chamber to drive the flow of the carbonated fluid out of the chamber until the end of dispensing. If any above-atmospheric pressure remains in the chamber the gas also cooperates with the chamber pressure until the residual partial pressure in the chamber has equalized to atmospheric pressure, at which time the forcing gas alone drives the flow of the carbonated fluid until the end of dispensing. Forcing the gas into the chamber during dispensing may compensate for a reduction in gravity assistance as the treated fluid is dispensed by providing a compensating increase in the forcing gas pressure during the dispense, which may help achieve uniformity of dispense rate. As discussed herein, the gas introduced into the chamber to drive flow can be air introduced using an air pump (e.g., the air pump 118 of FIG. 1, the first air pump 218 of FIG. 2, etc.) that forces the air into the chamber to drive flow of the treated fluid out of the chamber, or the gas introduced into the chamber to drive flow can be a same type of gas mixed with the liquid to form the treated fluid such that gas is forced from the gas source (e.g., the gas source 112 of FIG. 1, the gas source 212 of FIG. 2, the gas source 312 of FIG. 3, etc.) into the chamber, as regulated by a gas regulator (e.g., the gas regulator 114 of FIG. 1, the gas regulator 214 of FIG. 2, the gas regulator 314 of FIG. 3, etc.), to drive flow of the treated fluid out of the chamber.

The gas begins 518 being introduced into the chamber in response to a determination 516 (e.g., determined by the processor of the treatment system) that a second threshold has been met. In one embodiment, the second threshold is a pressure threshold. In such an embodiment, a pressure within the chamber is compared with a second predetermined threshold pressure value to determine 516 whether the second threshold has been met. The second predetermined threshold pressure value can be, for a variety of examples, about 0.03 bar gauge, about 0.05 bar gauge, or about 0.1 bar gauge. The pressure within the chamber can be measured, for example, using a pressure sensor (e.g., the pressure sensor 124 of FIG. 1, the pressure sensor 326 of FIG. 3, etc.) configured to measure pressure in the chamber and that is communicatively coupled to a processor of the treatment system configured to control introduction of the gas into the chamber, e.g., by controlling actuation of an air pump or a gas source. If the pressure within the chamber is determined 516 to be equal to or less than the second predetermined threshold pressure value the second threshold is met.

In another embodiment, the second threshold is a time threshold. In such an embodiment, when a time elapsed from a start 514 of treated fluid dispensing is determined 516 to be equal to or greater than a second predetermined threshold time value, the gas begins 518 being introduced into the chamber. The second predetermined threshold time value can be, for example, in a range of about 2 seconds to about 8 seconds. Elapsed time can be measured, for example, using a counter or other timer.

In some embodiments, only a pressure threshold is used as the second threshold. In other embodiments, only a time threshold is used as the second threshold. In still other embodiments, both pressure and time thresholds are used as the second threshold. In such embodiments, whichever threshold is met 516 first (pressure threshold or time threshold) triggers the start 518 of introducing gas into the chamber.

The gas continues being introduced into the chamber until a third threshold is determined 520 (e.g., determined by the processor of the treatment system) to be met. The introduction of the gas into the chamber can be controlled according to a pressure profile that provides a substantially steady flow of the treated fluid out of the chamber without sputtering at the end of the dispensing. A person skilled in the art will appreciate that a flow may not be precisely steady but nevertheless be considered to be substantially steady due to any number of factors, such as sensitivity of measurement equipment. When the fill level of the treated fluid in the chamber nears zero, there is a tendency for the last dispensed amount of the treated fluid to sputter out of the outlet valve and cause droplets of the treated fluid to splatter outside of the container in which the treated liquid is intended to be dispensed. Controlling the introduction of the gas into the chamber according to the pressure profile can reduce sputtering, including elimination of sputtering. The introduction of the gas into the chamber is controlled by controlling the air pump or gas regulator, e.g., by a processor of the treatment system controlling the air pump or gas regulator.

In some embodiments, the pressure profile is a predetermined substantially steady flow of the gas into the chamber that does not vary over time as the gas is introduced into the chamber.

In some embodiments, the pressure profile is configured to vary over time as the forcing gas is introduced into the chamber, e.g., varies over time between the sixth time $t_6$ and a seventh time $t_7$ at which dispensing stops. In this way, an amount of the gas introduced into the chamber can vary over time with an amount of force used to introduce the gas into the chamber varying over time, which may help ensure that the treated fluid is dispensed at a substantially steady rate. The pressure profile can vary in a variety of ways. For example, the pressure profile can be configured to change based on carbonation level. For another example, the pressure profile can be configured to change based on fill level in the chamber. The fill level provides a known pressure contribution to the forces driving dispensing of the treated fluid. The contribution is a linear function of the height of the liquid in the chamber above the outlet. Because the geometry of the chamber and outlet is known, the processor of the treatment system can apply a linear correction (increase) to the forcing gas pressure to account for the decline in gravitational head pressure. The temperature within the chamber can be measured, for example, using a temperature sensor (e.g., the temperature sensor 126 of FIG. 1, the temperature sensor 328 of FIG. 3, etc.) configured to measure temperature in the chamber and that is communicatively coupled to a processor of the treatment system configured to control introduction of the gas into the chamber, e.g., by controlling actuation of an air pump or a gas source. For another example, the pressure profile can be configured to change based on flow resistance versus time of the outlet valve.

As mentioned above, the gas is introduced into the chamber to drive flow of the treated fluid out of the chamber until the third threshold is determined 520 (e.g., determined by the processor of the treatment system) to be met. In one embodiment, the third threshold is a pressure threshold. In such an embodiment, a pressure within the chamber is compared with a third predetermined threshold pressure value to determine 520 whether the third threshold has been met. In general, the third predetermined threshold pressure value represents the pressure that is reached when the chamber has substantially emptied of the treated fluid and the dispense path is available for gas to begin flowing out through the dispense pathway. Because gas viscosity is so much lower than liquid viscosity, at the transition from treated fluid dispense to gas dispense, there will be a further sharp decrease in chamber pressure. The system (e.g., the processor of the treatment system) can be configured to detect a rate of change of chamber pressure to detect this event and to determine 520 whether the third threshold has been met. Alternatively, a suitable low pressure above ambient pressure, such as about 0.001 bar gauge or other value, can be selected to determine 520 whether the third threshold has been met. The pressure within the chamber can be measured, for example, using a pressure sensor (e.g., the pressure sensor 124 of FIG. 1, the pressure sensor 326 of FIG. 3, etc.) configured to measure pressure in the chamber and that is communicatively coupled to a processor of the treatment system configured to control introduction of the gas into the chamber, e.g., by controlling actuation of an air pump or a gas source. If the pressure within the chamber is determined 520 to be equal to or less than the third predetermined threshold pressure value the third threshold is met and gas stops 522 being introduced into the chamber at the seventh time $t_7$ and dispensing stops.

In another embodiment, the third threshold is a time threshold. In such an embodiment, when a time elapsed from a start 518 of gas introduction into the chamber is determined 520 to be equal to or greater than a third predetermined threshold time value, the gas stops 522 being introduced into the chamber. In general, the third predetermined threshold time value can vary based on the carbonation level. The third predetermined threshold time value can be, for example, in a range of about 2 seconds to about 6 seconds. Elapsed time can be measured, for example, using a counter or other timer. If the elapsed time is determined 520 to be equal to or greater than the third predetermined threshold temperature value the third threshold is met and gas stops 522 being introduced into the chamber at a seventh time $t_7$ and dispensing stops.

In another embodiment, the third threshold is a temperature threshold. In such an embodiment, a temperature within the chamber is compared with a third predetermined threshold temperature value to determine 520 whether the third threshold has been met. The third predetermined temperature time value can be, for example, in a range of about 45° F. to about 50° F. The temperature within the chamber can be measured, for example, using a temperature sensor (e.g., the temperature sensor 126 of FIG. 1, the temperature sensor 328 of FIG. 3, etc.) configured to measure temperature in the chamber and that is communicatively coupled to a processor of the treatment system configured to control introduction of the gas into the chamber, e.g., by controlling actuation of an air pump or a gas source. If the temperature within the chamber is determined 520 to be equal to or less than the third predetermined threshold temperature value the third threshold is met and gas stops 522 being introduced into the chamber at a seventh time $t_7$ and dispensing stops.

In some embodiments, only a pressure threshold is used as the third threshold. In other embodiments, only a time threshold is used as the third threshold. In still other embodiments, a combination of any two or more of pressure, temperature, and time thresholds are used as the third threshold. In such embodiments, whichever threshold is met 520 first (pressure threshold, temperature threshold, or time threshold) triggers stopping 522 the introduction of gas into the chamber at the seventh time $t_7$ and dispensing stops.

The method 500 can repeat any number of times to form and dispense treated fluids.

Figure 8:
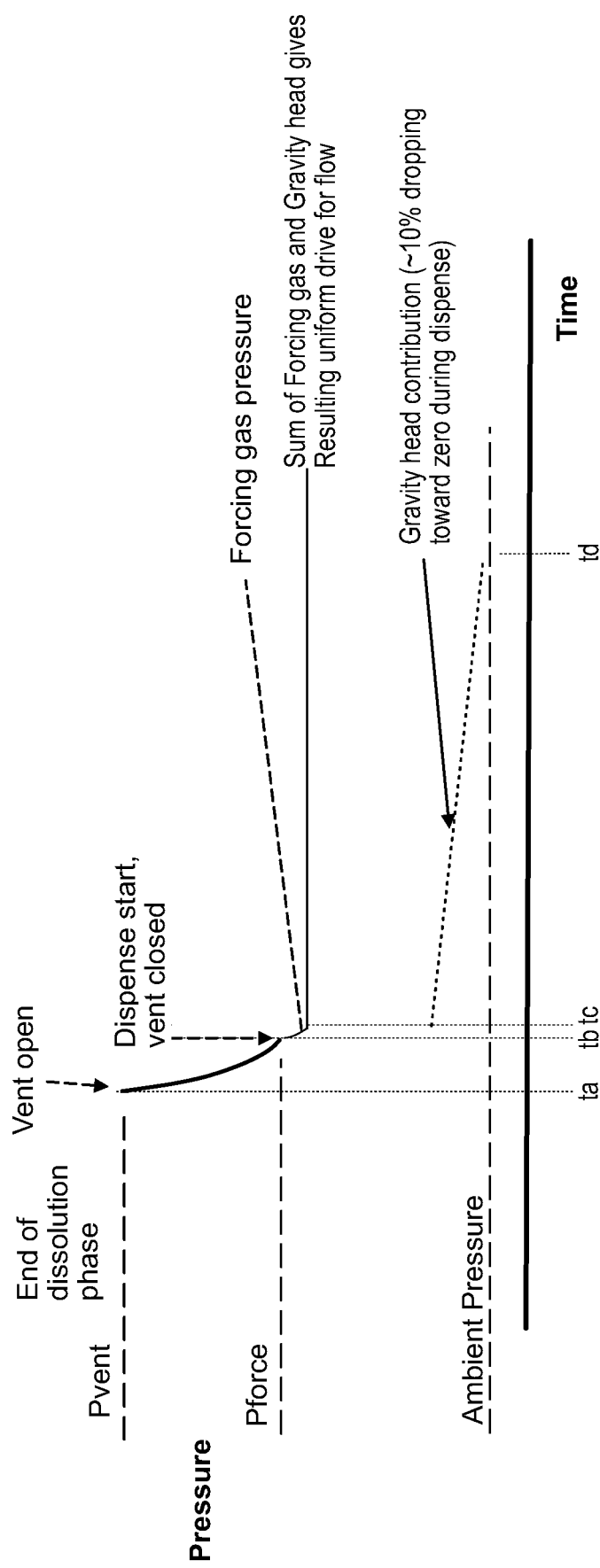
FIG. 8 is another embodiment of a graph showing pressure versus time for the method of FIG. 6.

FIG. 8 illustrates another graph showing another example operation of the method 500. The method 500 generally occurs as discussed above with respect to FIG. 7 except as noted below. The graph of FIG. 8 plots pressure versus time for one mixing cycle.

The method 500 as discussed above occurs with a liquid being added 502 to a chamber of a treatment system, adding 504 gas to the chamber, activating 506 a motor to drive rotation of an agitator in the chamber and form a treated fluid, and stopping 508 the motor to stop causing the agitator's rotation. At a first time ta shown in FIG. 8, a vent opens to start pressure being released 510 from the chamber, e.g., to atmosphere through a vent solenoid (e.g., the vent solenoid valve 120 of FIG. 1, the vent solenoid valve 220 of FIG. 2, the vent solenoid valve 322 of FIG. 3, etc.) or to a second chamber. The pressure in the chamber reaching a first threshold pressure Pvent at the first time ta triggers the opening of the vent.

The vent remains open until the pressure in the chamber has decreased to a second threshold pressure Pforce at a second time $t_b$. The pressure in the chamber reaching the second threshold pressure Pforce at the second time $t_b$ triggers the closing of the vent and the opening of an outlet valve of the treatment system. The pressure in the chamber reaching the second threshold pressure Pforce thus triggers a start 514 of dispensing treated fluid from the chamber since the outlet valve becomes open. Exact timing of the vent closing versus outlet valve opening for dispensing and forcing gas introduction can be adjusted to account for the starting transient behaviour of the flow.

With the treated fluid having started 514 to be dispensed at the second time $t_b$, pressure is still being released from the chamber, as shown in FIG. 8 with the pressure decreasing below the second threshold pressure Pforce. At a third time $t_c$, gas starts 518 being forced into the chamber to drive a flow of the treated fluid out of the chamber. As discussed above, the gas (labeled "forcing gas" in FIG. 8) begins 518 being introduced into the chamber in response to a determination 516 (e.g., determined by the processor of the treatment system) that a second threshold has been met. As also discussed above, the gas continues being introduced into the chamber until a third threshold is determined 520 (e.g., determined by the processor of the treatment system) to be met. The gas then stops 522 being introduced into the chamber at a fourth time td and dispensing stops. FIG. 8 illustrates that forcing gas pressure ramps upward to compensate for falling gravity head pressure. A sum of the forcing gas pressure and the and gravity head pressure gives a resulting uniform drive for flow. In one example, the gravity head pressure is about 8 mbar at the start, compared to a total driving pressure of about 50 mbar.

As mentioned above, a treatment system can include a processor, such as a microcontroller that includes a processor and a memory, or other type of processor. With respect to the method 500 of FIG. 6, a processor of a treatment system can be configured to cause the activation 506 of the motor (e.g., by transmitting a control signal to the motor), to cause the motor to stop 508 (e.g., by transmitting a control signal to the motor), to cause the pressure to start being released 510 from the chamber (e.g., by transmitting a control signal to a vent solenoid of the treatment system that causes the vent solenoid to open), to determine 512 whether the threshold has been met (e.g., by comparing a measured value with a predetermined threshold value stored in a memory accessible to the processor), to allow treated fluid to begin being dispensed 514 from the chamber by causing an outlet valve of the treatment system to open (e.g., by transmitting a control signal to the outlet valve that causes the outlet valve to open), and causing the outlet valve to close after the dispensing of the treated fluid has ended (e.g., by transmitting a control signal to the outlet valve that causes the outlet valve to close).

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, algorithm, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code).

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices). The processor and the memory can be supplemented by, or incorporated in, special purpose logic circuitry.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor). The modules described herein can be combined, integrated, separated, and/or duplicated to support various applications. Also, a function described herein as being performed at a particular module can be performed at one or more other modules and/or by one or more other devices instead of or in addition to the function performed at the particular module.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

The present disclosure has been described above by way of example only within the context of the overall disclosure provided herein. It will be appreciated that modifications within the spirit and scope of the claims may be made without departing from the overall scope of the present disclosure.

What is claimed is:

1. A method comprising:
    forming a treated fluid in a chamber of a treatment system, the chamber having an initial pressure after forming the treated fluid;
    venting pressure from the chamber for a period of time;
    starting to dispense treated fluid from the treatment system at a first point in time during the period of time, the chamber having a first pressure at the first point in time that is less than the initial pressure, and wherein the first pressure assists in causing the treated fluid to be dispensed from the treatment system; and
    inputting a first gas into the chamber at a second point in time during the dispensing of the treated fluid, the chamber having a second pressure at the second point in time that is less than the first pressure, and wherein the inputting of the first gas assists in causing the treated fluid to dispense from the treatment system.

2. The method of claim 1, wherein the treated fluid is dispensed from the first point in time to an end of dispensing at a substantially steady flow rate.

3. The method of claim 2, further comprising controlling a flow of the first gas input into the chamber to maintain the substantially steady flow rate.

4. The method of claim 3, wherein controlling the flow includes modifying the flow during the dispensing.

5. The method of claim 1, wherein forming the treated fluid includes adding a liquid to the chamber, adding carbon dioxide to the chamber, and agitating the liquid and the carbon dioxide in the chamber.

6. The method of claim 5, wherein the agitating is performed concurrently to adding the carbon dioxide.

7. The method of claim 6, wherein the agitating continues after stopping the adding of the carbon dioxide.

8. The method of claim 5, further comprising, after an initial period commencing at a start of the carbon dioxide being added, substantially maintaining the pressure in the chamber at a predetermined level until stopping the adding of the carbon dioxide.

9. The method of claim 1, wherein forming the treated fluid includes mixing a liquid introduced into the chamber with a second gas introduced into the chamber; and
   the second gas is a same type of gas as the first gas or the second gas is a different type of gas from the first gas.

10. The method of claim 9, wherein the liquid is water, and the second gas is carbon dioxide.

11. The method of claim 1, wherein forming the treated fluid includes mixing a liquid introduced into the chamber with carbon dioxide introduced into the chamber; and
   the first gas is air or the first gas is carbon dioxide.

12. The method of claim 1, wherein beginning to dispense the treated fluid includes opening a valve of the treatment system.

13. The method of claim 1, wherein the venting of the pressure includes opening a valve in a headspace above the treated fluid in the chamber.

\* \* \* \* \*